(12) United States Patent
Scarlett

(10) Patent No.: US 12,332,389 B2
(45) Date of Patent: Jun. 17, 2025

(54) SYSTEMS AND METHODS FOR COUPLING FIELDS TO EXOTIC MATTER

(71) Applicant: Carol Y. Scarlett, Tallahassee, FL (US)

(72) Inventor: Carol Y. Scarlett, Tallahassee, FL (US)

(*) Notice: Subject to any disclaimer, the term of this patent is extended or adjusted under 35 U.S.C. 154(b) by 203 days.

(21) Appl. No.: 18/143,025

(22) Filed: May 3, 2023

(65) Prior Publication Data

US 2023/0358900 A1 Nov. 9, 2023

Related U.S. Application Data

(63) Continuation-in-part of application No. PCT/US2021/057944, filed on Nov. 3, 2021.

(60) Provisional application No. 63/109,249, filed on Nov. 3, 2020.

(51) Int. Cl.
*G01T 1/18* (2006.01)

(52) U.S. Cl.
CPC ..................... *G01T 1/18* (2013.01)

(58) Field of Classification Search
CPC .... G01T 1/18; G01T 1/10; G01T 1/16; G21G 4/00
See application file for complete search history.

(56) References Cited

U.S. PATENT DOCUMENTS 3,825,751 A * 7/1974 Johnson, Jr. .......... G01V 5/025
250/361 R
4,704,537 A * 11/1987 Urban .................. G01T 5/10
250/DIG. 2
2010/0187411 A1 7/2010 Chyi et al.

OTHER PUBLICATIONS

Belotti et al. Precise Measurement of the $^{222}$ Rn half-life: A Probe to Monitor the stability of radioactivity *Physics Letters B* 743, 526-530, (2015).
Walg et al. "Solar Flare Detection Method using Rn-222 Radioactive Source", Nuclear Engineering, Ben Gurion University of the Negev, Beer Sheva, Israel.
International Search Report and Written Opinion for PCT/US21/57944, dated Mar. 21, 2022.

* cited by examiner

*Primary Examiner* — Dani Fox
*Assistant Examiner* — Fani Polyzos Boosalis
(74) *Attorney, Agent, or Firm* — MARSHALL, GERSTEIN & BORUN LLP

(57) ABSTRACT

Techniques for coupling fields to exotic matter at a particular location to identify, or determine the current date/time at that location, are provided. Example techniques include capturing sensor data indicating a decay rate associated with a radioactive material at the location over a period of time; analyzing the sensor data indicating the decay rate associated with the radioactive material at the location over the period of time in order to identify a peak decay rate over the period of time and a point in time, over the period of time, at which the peak decay rate occurred; and determining one or more of: a current time at the particular location, a current date at the location, or an identification of the location, based on one or more of: the peak decay rate or the point in time over the period of time at which the peak decay rate occurred.

20 Claims, 21 Drawing Sheets

SYSTEMS AND METHODS FOR COUPLING FIELDS TO EXOTIC MATTER

FIELD OF THE INVENTION

The present disclosure generally relates to technologies for coupling fields to exotic matter at a particular location, in order to identify the particular location or determine the current date or time at that particular location.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Existing global positioning systems rely on satellites, which are expensive, costing hundreds of millions of dollars to launch and maintain. Furthermore, satellites can be damaged (e.g., during solar storms), and can sometimes be out of reach.

SUMMARY

In one aspect, a computer-implemented method for coupling fields to exotic matter at a particular location, in order to identify the particular location or determine the current date or time at that particular location, is provided. The method may include method may include capturing, by one or more sensors, sensor data indicating a decay rate associated with a radioactive material at a particular location over a period of time; analyzing, by one or more processors, the sensor data indicating the decay rate associated with the radioactive material at the particular location over the period of time in order to identify a peak decay rate over the period of time and a point in time, over the period of time, at which the peak decay rate occurred; and determining, by the one or more processors, one or more of: a current time at the particular location, a current date at the particular location, or an identification of the particular location, based on one or more of: the peak decay rate or the point in time over the period of time at which the peak decay rate occurred. The method may include additional, less, or alternate actions, including those discussed elsewhere herein.

In another aspect, a computer system for coupling fields to exotic matter at a particular location, in order to identify the particular location or determine the current date or time at that particular location, is provided. The computer system may include one or more sensors configured to capture sensor data indicating a decay rate associated with a radioactive material at a particular location over a period of time; one or more processors; and a non-transitory memory storing computer readable instructions that, when executed by the one or more processors, cause the one or more processors to: analyze the sensor data indicating the decay rate associated with the radioactive material at the particular location over the period of time in order to identify a peak decay rate over the period of time and a point in time, over the period of time, at which the peak decay rate occurred; and determine one or more of: a current time at the particular location, a current date at the particular location, or an identification of the particular location, based on one or more of: the peak decay rate or the point in time over the period of time at which the peak decay rate occurred. The system may include additional, less, or alternate functionality, including that discussed elsewhere herein.

In still another aspect, a non-transitory computer-readable storage medium storing computer-readable instructions for coupling fields to exotic matter at a particular location, in order to identify the particular location or determine the current date or time at that particular location, is provided. The instructions, when executed by one or more processors, may cause the one or more processors to: receive sensor data from one or more sensors indicating a decay rate associated with a radioactive material at a particular location over a period of time; analyze the sensor data indicating the decay rate associated with the radioactive material at the particular location over the period of time in order to identify a peak decay rate over the period of time and a point in time, over the period of time, at which the peak decay rate occurred; and determine one or more of: a current time at the particular location, a current date at the particular location, or an identification of the particular location, based on one or more of: the peak decay rate or the point in time over the period of time at which the peak decay rate occurred. The instructions may direct additional, less, or alternative functionality, including that discussed elsewhere herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

There are shown in the drawings arrangements which are presently discussed, it being understood, however, that the present embodiments are not limited to the precise arrangements and instrumentalities shown, wherein.

Figure 1A:
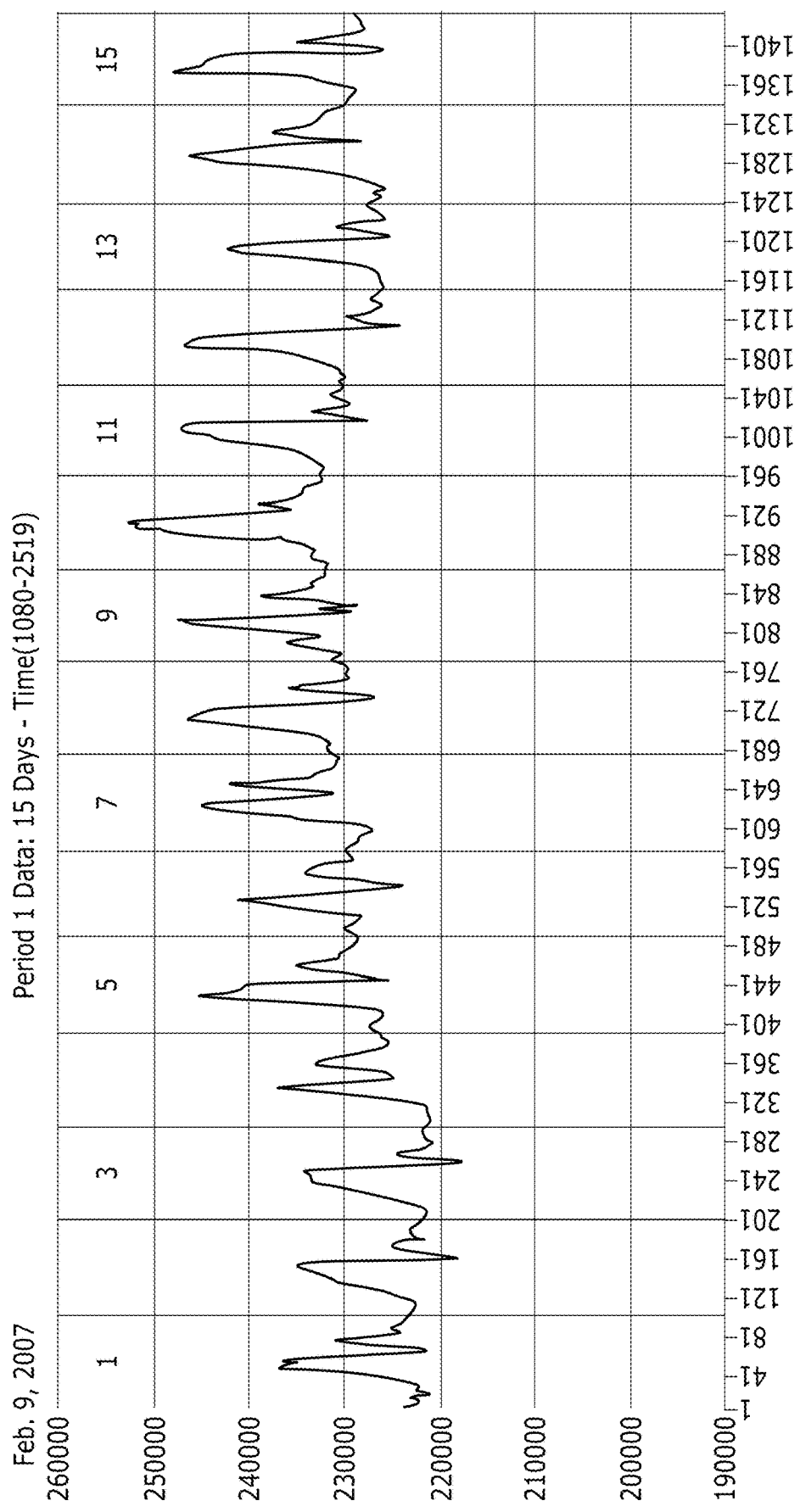
FIGS. 1A-1D illustrates a sample of radon decay data from a Geological Survey of Israel (GSI) experiment taken in 2007 centered on the four annual seasons—February, May, August and November.
Figure 1B:
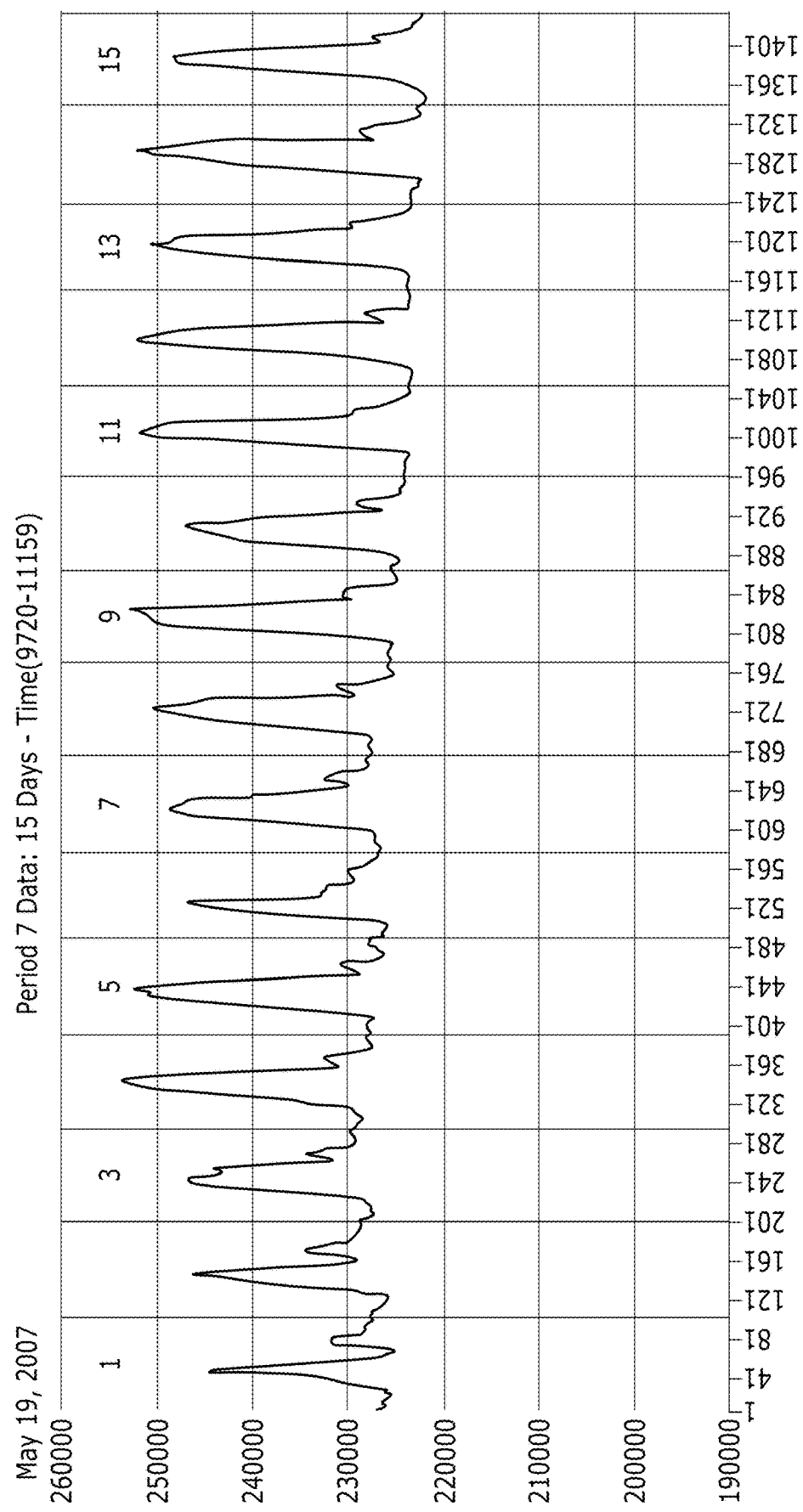
Figure 1C:
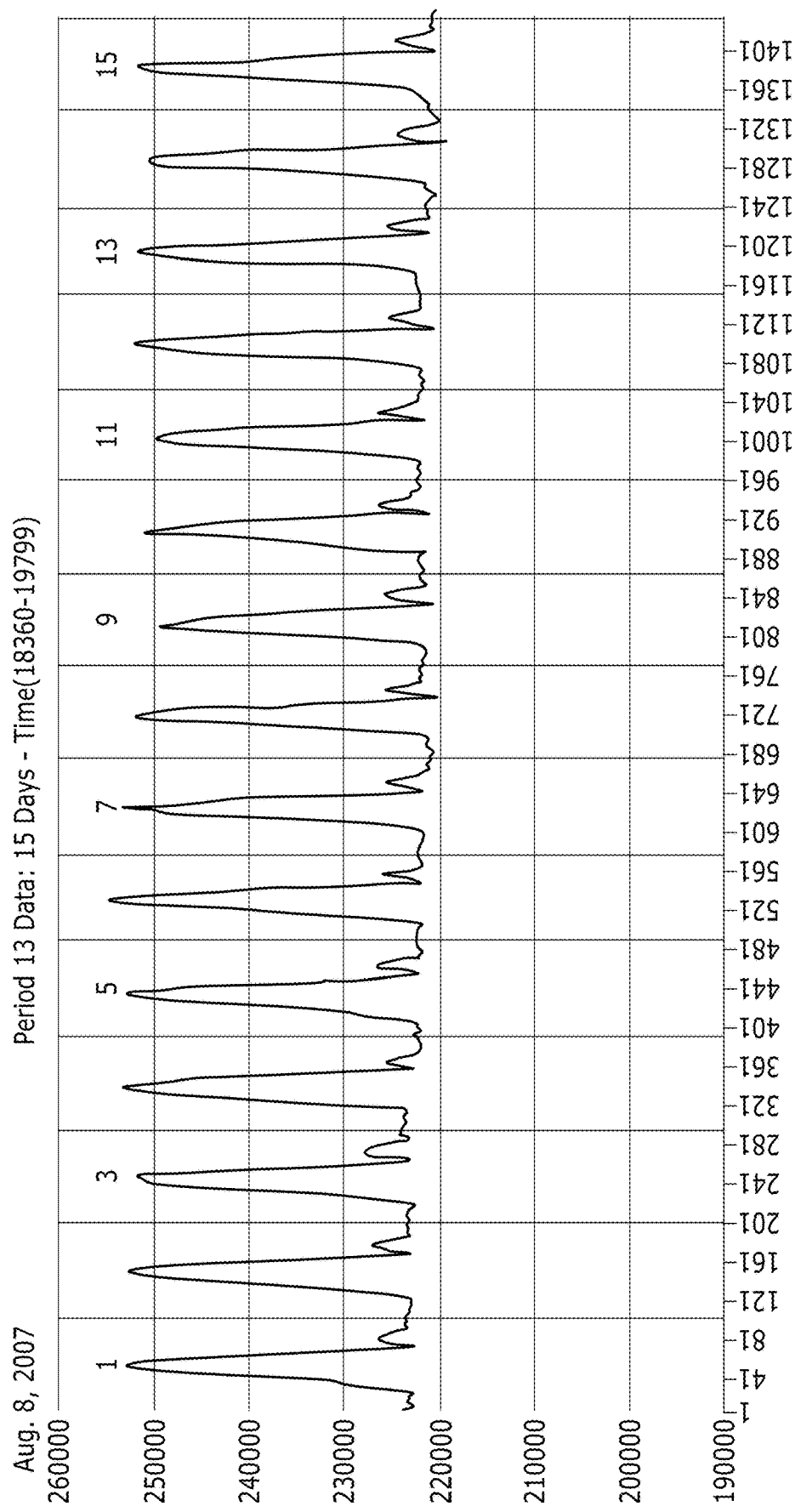
Figure 1D:
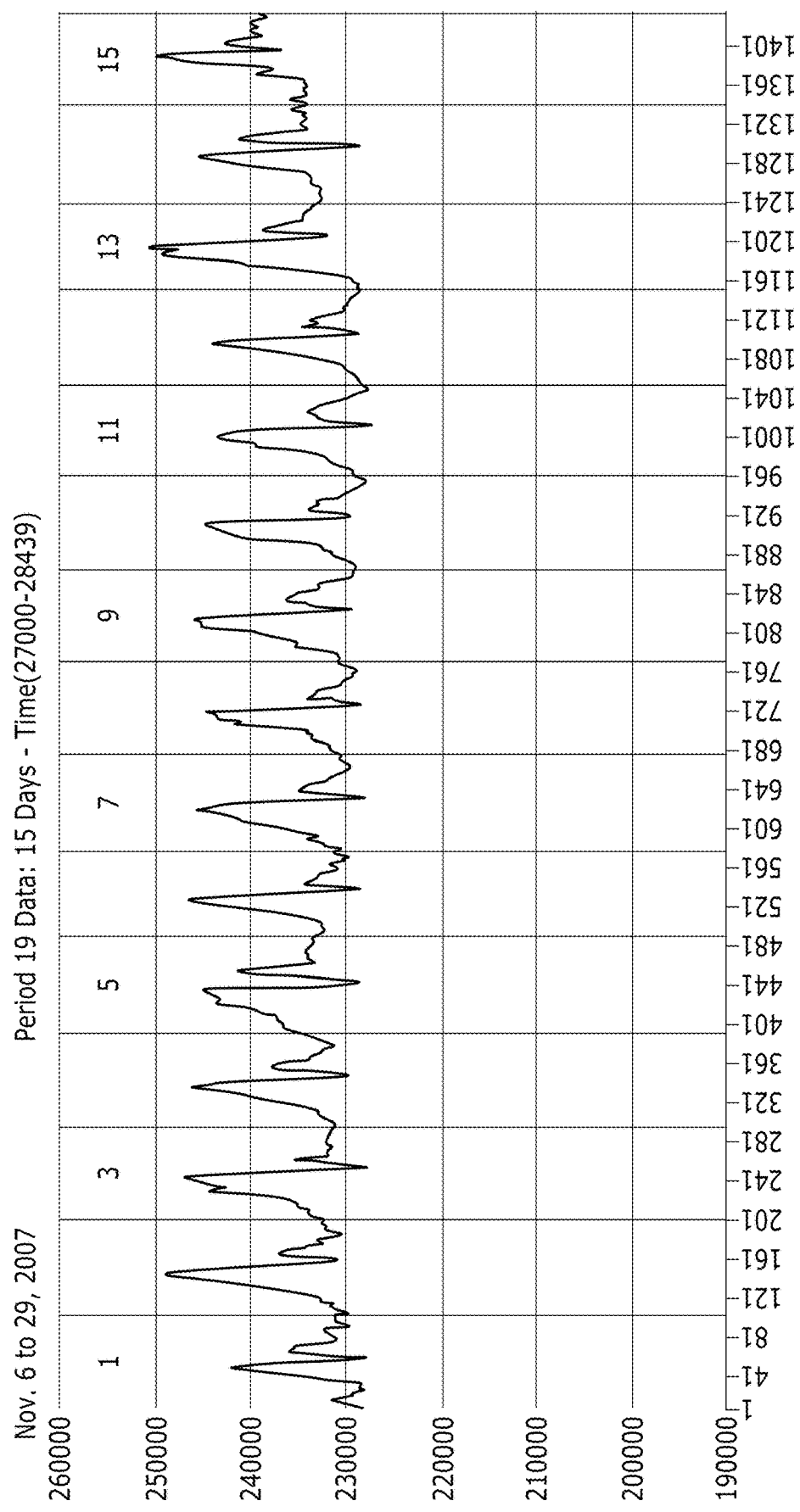

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples.

Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

Overview

Nuclear energy production harnesses stored, excess energy from radioactive isotopes using infrastructure to control and directs decay products, a process with inefficiencies. The process of extracting energy from radioactive nuclear materials leads to the production of nuclear waste that requires long-term containment. Nuclear byproducts can sometimes be reused for energy production. Developing technology that can influence nuclear decays over very long distances could lead to the development of techniques that can enable detection of enrichment facilities. Currently, such detection of facilities requires cooperation between nations, which sometimes beaks down. For instance, existing approaches may rely on pellets of refined, enhanced Uranium. The techniques provided herein have a reduced need for ignition sources, compared to existing approaches, and use and contain stored nuclear energy more efficiently. Furthermore, the techniques provided herein allow the sending of long ranged beams to other areas of the planet for directing decay products and detecting enrichment facilities.

Having observed that crossed photon-magnetic fields may push additional matter through a material, stimulating decays, and that Radon-222 (Rn-222) shows decays that modulate with solar and albedo radiation, this work looks at determining day and time using a system of detectors for Rn-222. The inventions builds on similar technology proposed for stimulating nuclear decay for purposes of nuclear energy production. Developing technology that can detect accurately the date and time in the earth's calendar has been used to create GPS. The technology here makes use of an observed effect in radon decay to record date and time of day.

Using the techniques provided herein, a method includes using natural and induced variations in the radio nuclear decay of Radon-222 to predict date and time for use in ground-based GPS applications. Another method includes using natural and induced variations of rates of nuclear decay of Radon-222 to detect and/or predict solar changes in magnetic output. Another method includes inducing variations of Radon-222 and, in response, enhancing output energy production and collection from radio isotopes.

More specifically, the techniques provided by the present disclosure use an arrangement of photon and magnetic fields to steer exotic particles. As discussed in greater detail below, new research shows that Radon-222 decay rates oscillate diurnally and with annual solar intensity (see, e.g., FIGS. 2A-2B and FIG. 3, and the related discussion thereof below). Solar and albedo wavelengths, which were initially thought to be a potential cause of this oscillation in Radon-222 decay rates, are too low to effect these nuclei. Instead, the Primakoff mechanism may be the actual cause of this oscillation. Models associated with the Primakoff mechanism suggest that exotic particles can couple to nuclei via photonic and magnetic fields, which may explain the observed oscillation in the Radon-222 decay rates, leading to the vector sum of fields shown at FIG. 8C.

In an example, the techniques provided by the present disclosure take advantage of this novel photonic-nuclear effect in order to use an arrangement of photon and magnetic fields to envelop and steer exotic particles, impacting the number and direction of nuclear decay products. For instance, nuclear decay products may be steered along a specific special direction—perpendicular to both the optical and magnetic fields. For example, the fluctuations in oscillation rate for observed decay may be 5%-14%, with an enhancement of 2%-10% accompanying the steering effect, and a reduction of 2%-3% when albedo/solar radiation levels are high. The steering of decay products into detector elements (e.g., NaI detectors, or other detection techniques) can provide a mechanism for detecting radioactive nuclei. For instance, the effect can be amplified using a large volume device compared to the volume of target material. This new method for bundling enables identification of fiber position to maximize extracted information. Moreover, these improvements will enable new technology for utilizing stored nuclear energy, detecting areas where enhanced nuclear energy exists through steering of decay products, and containing nuclear waste.

Beyond defense applications, worldwide, 10% of all electrical power comes from use of nuclear materials—there is an international market for new technology to improve efficiency and storage of radioactive materials. The US has a number of nuclear power plants and private endeavors to utilize nuclear energy. This work will be transformative to the energy industry.

Furthermore, in an example, photon and magnetic fields may be arranged in order to steer exotic particles for an accurate measure of both calendar day and time, allowing for ground-based measurement of day/time without requiring the use of satellites. In particular, solar effects upon Radon-222 decay rates that are specific to particular locations at particular dates/times may be measured in order to identify the location at which the effects were measured, and/or the dates/times at which the effects were measured. That is, these improvements enable new technology for ground-based positioning systems. Worldwide, GPS is necessary for many information systems, and having a ground-based option could provide an important backup to satellites. Such a ground-based GPS could also serve the auto industry in the era of self-driving cars and the new "people mover" tech as alternatives to individual cars.

Geologic Survey of Israel (GSI) Experiment

A new analysis of the observations of radon decay was performed in an enclosed environment by the Geological Survey of Israel (GSI) between 2007 and 2012. The data shows a large peak around local noon followed by an abrupt drop, and by a second peak around 6 PM local time. Additionally, there is also a very low amplitude peak occurring before daybreak. The salient features of the GSI radon decay data can be modeled as arising from a change in the radon decay rate ('r), rather than due to the changes in the local concentration of radon (N0). Such a model may provide a clue to long theorized axionic, dark matter, interactions. Finally, new experimentation is suggested that can distinguish between changes in N0 vs 'r. Should a follow-up experiment show an effect similar to GSI, this could have significant implications for elementary particle physics.

Introduction

The study of radioactive decay has led to successful models of nuclear structure, explaining phenomena as varied as nuclear stability, decay half-life ('r), and parity violation in beta decays. In heavy metal nuclei that alpha decay, models describing the radioactive transitions rely on quantum tunneling through the nuclear barrier. Such tunneling is well known to be exponentially dependent on the energy of the released alpha particle, scaling thirty-five orders of magnitude ($10^{+35}$) for energy changes of as little as ~4 MeV. This makes alpha decay an ultra-sensitive probe of the available excess energy within a nucleus. This also means that energy fluctuations of the outgoing alpha by as little as $10^{+2}$ eV (104 MeV) can yield a few percent change in decay lifetime. The present disclosure discusses whether evidence supports a modification to the calculation of 'r due to environmental factors that can describe the GSI observations.

Over ten years of data on radon decays have been acquired by the Geological Survey of Israel (GSI). The present disclosure analyzes the period between 2007-2012. During this period, the GSI data shows consistent diurnal and annual oscillations that do not appear consistent with variations in background concentrations as suggested elsewhere—a follow up paper shows detailed comparisons of the oscillations to temperature and weather condition while earlier work by Steinitz and Sturrock have eliminated correlations to power fluctuations. Here it is proposed that these oscillations may be understood in terms of a mechanism known as the Primakoff effect, whereby low energy photons produce and scatter axionic, dark matter particles that in turn can interact with nuclear matter. What is significant about this effect in the present context is that it may provide an unexpected connection between radon decays and dark matter.

Data Analysis

Data Review

FIGS. 1A-1D show a sample of data from the GSI experiment taken in 2007 centered on the four annual seasons—February, May, August and November. What can be seen is diurnal behavior with a total of three peaks: 12 pm, 6 pm, and approximately 12 am to 1 am. In addition to the three diurnal peaks, there is a striking rise in the amplitude of the peak above background over the course of one year when going from winter, to spring, to summer and finally to fall. The largest peak, occurring at 12 pm, shows an average of 5.2% enhancement above background during January, while in June the noon 12 pm peak shows an average of 15.9% enhancement above the background. Qualitatively, there is a factor of three in enhancement of the noon peak above background over the course of the year, and this annual cycling is observed in subsequent years (2008-2012) as well.

Figure 2A:
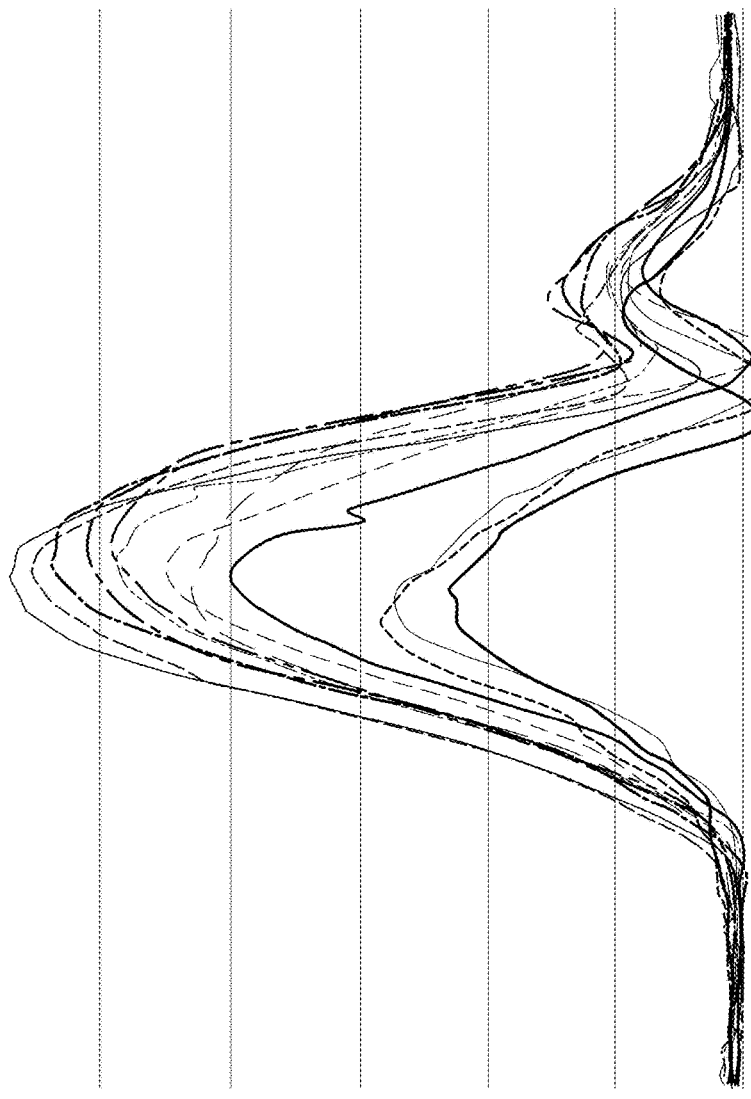
FIG. 2A illustrates radon decay data from ten 15-day periods where the GSI data have been summed to form a single distribution.
Figure 2B:
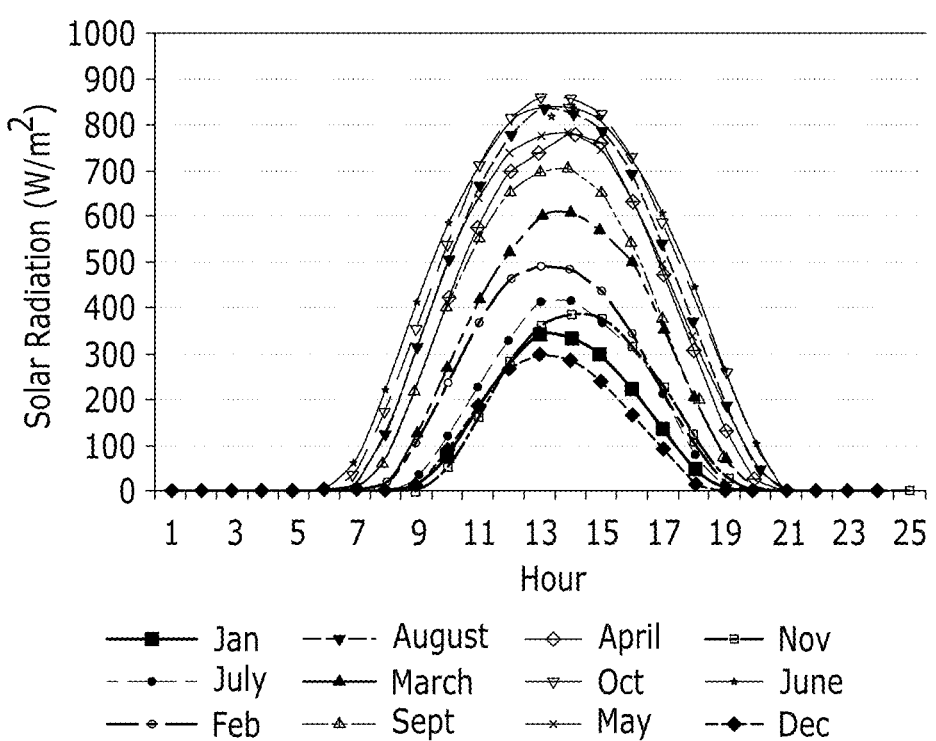
FIG. 2B illustrates solar irradiance data as measured at ground level over the course of a single year during the GSI experiment.
Figure 3:
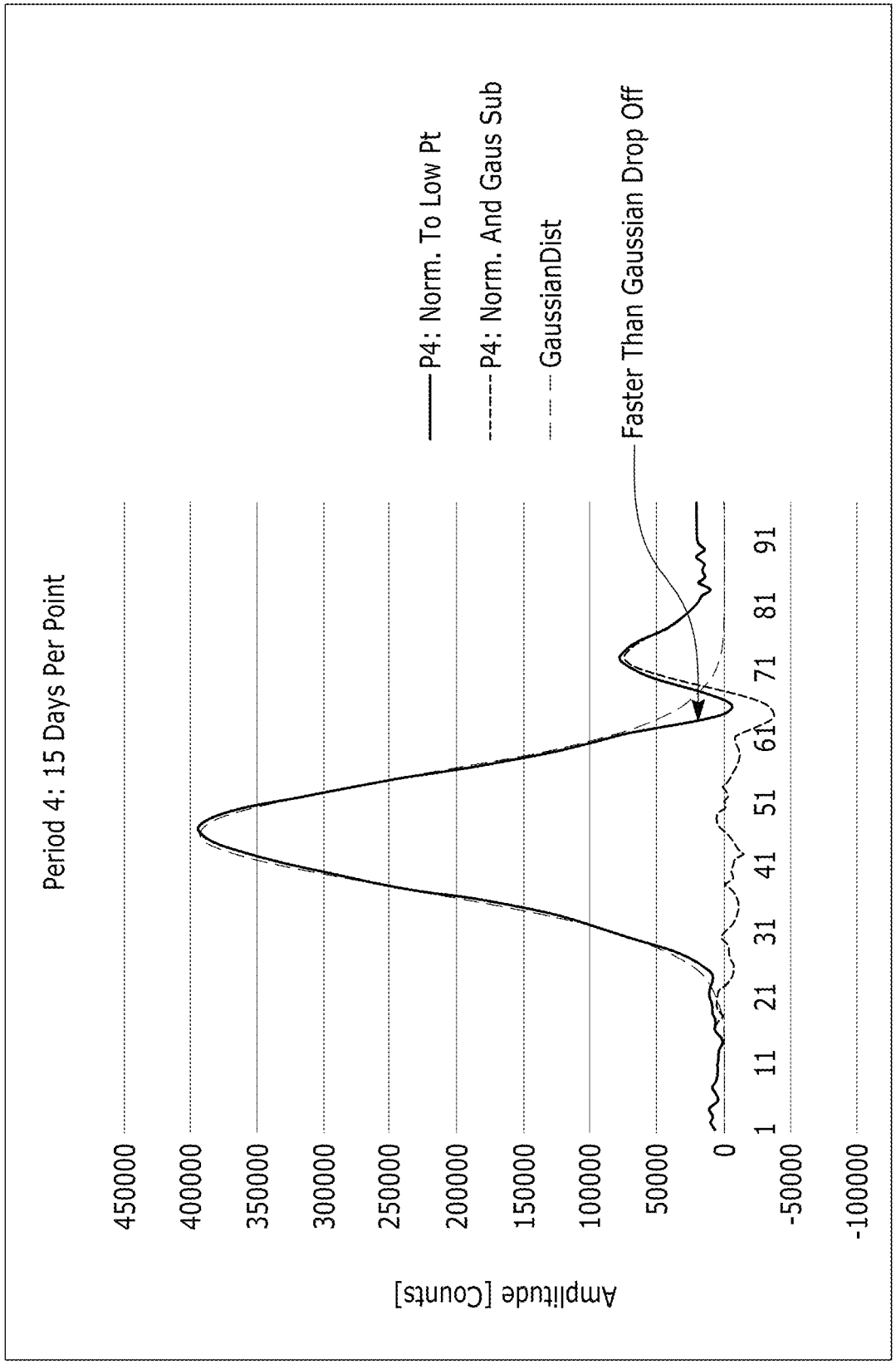
FIG. 3 illustrates radon decay data as measured during the GSI experiment, as compared to a Gaussian curve.
Figure 4:
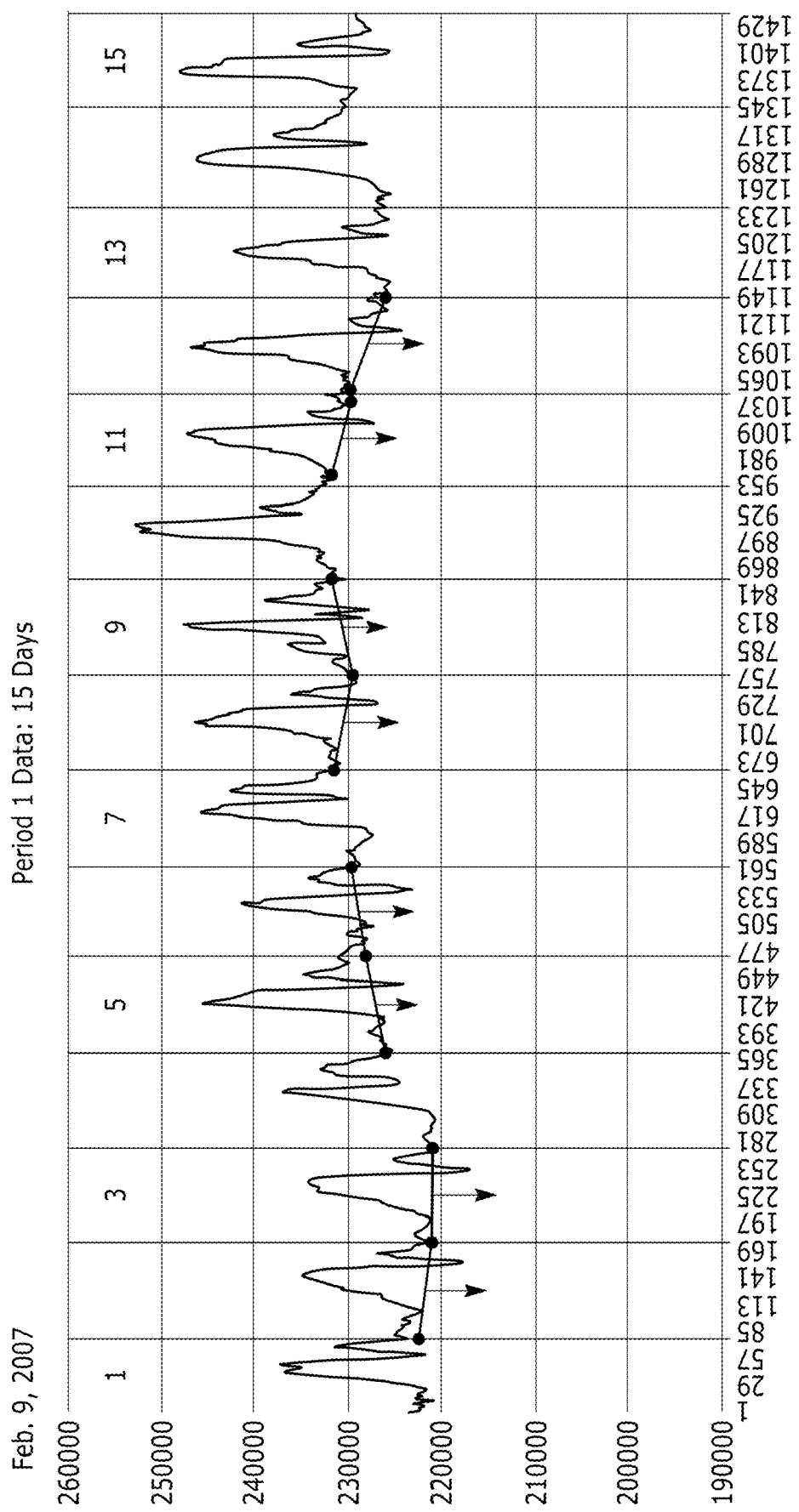
FIG. 4 illustrates radon decay data as measured over a 15-day period during the GSI experiment.

FIG. 2A shows ten periods where the GSI data have been summed every fifteen days, e.g. Period 1 covers February $9^{th}$ to February $23^{rd}$ of 2007, to form a single distribution. FIG. 2B shows, for comparison, solar irradiance on the ground over the course of a single year. It is clear that the GSI data have a noon peak with an amplitude that tracks with the increase in solar intensity on the ground, over the course of the year. A more detailed comparison of the noon GSI peak, (see FIG. 3), reveals that the increase in the detected gamma rays, arising from the daughter particle of radon, have a Gaussian distribution. However, beginning around 3 pm, the detected number of decays drop at a rate faster than a Gaussian function, giving the peak an asymmetric structure. The rapid drop off in detected decays, between noon and approximately 3 pm daily, often results in an overall rate that dips below the baseline. This baseline is defined as the average decay rate using sideband regions of the visible peaks, for time around 12 am on one day until 1 am the next day (see FIG. 4).

In addition to the 12 pm peak, there are peaks centered at roughly the 6 pm and 12 am-1 am hours. These peaks have lower amplitudes and shorter durations as seen in FIGS. 1-4. The amplitude of the noon peak shows a consistent oscillation which tracks the intensity of sunlight hitting the Earth. Thus the first order effect involves a mechanism that scales proportionately with solar irradiance.

Nuclear Decay Models

Quantitatively, nuclear decay is described by an exponential function. The exponential law of decay, equation 1, describes the time dependence of radioactivity samples as derived from just the internal nuclear structure. The parameters needed to calculate a specific count rate are just the number of available radioactive nuclei (N0), local concentration, and the decay half-life ('r)—defined as the time needed for half of the available nuclei to decay:

$$N(t) = N_0 \cdot e^{-0.693 \cdot t/\tau} \quad (1)$$

Any observed number of decays during a time period, e.g. per second, can be used to determine: 1. the number of nuclei available to decay, if the half-life is known, or 2. the half-life, provided the number available nuclei is known. The environment outside the nucleus is assumed to not impact nuclei half-life. In theory, once a material's half-life is known, any observed fluctuations in N(t) arise from variance in N0. However, alpha decay is ultra-sensitive to the energy available to the outgoing alpha particle. Allowing for a half-life that changes as a function of external parameters, which can also be time dependent, equation (1) can be rewritten:

$$N(t) = N_0 \cdot e^{-0.693 \cdot t/\tau(x(t))} \quad (2)$$

Distinguishing between changes in N0 and 'r(x(t)) requires careful experimentation to control and account for the local concentrations N0.

It has always been assumed that the intense energies required for most nuclear excitations mean that the decay half-life of a specific nuclei is in fact constant. Dating back to some of the first radium experiments, Madame Curie et. al. attempted to stimulate radioactivity. Data taken from cooling, heating and pressurizing radioactive materials have shown only infinitesimal changes that have been written off as near the limit of experimentation. However, the Geiger-Nuttall model of heavy metal radio-isotopes that undergo alpha decay gives an amazingly steep curve for relatively small energy changes. Equation 3 shows how the law derives from the nuclear parameters:

$$\ln \tau \sim 2G + \ln \frac{2R}{v} \quad (3)$$

The second term in equation 3 is the constant parameter, dependent on the nuclear radius (R) and the velocity of the alpha particle in the nucleus. The exponential factor, is called the Gamow Factor (G) is related to the number of protons (Z), the square-root of the energy of the alpha (E) and an energy parameter (3.9 MeV).

$$G \sim Z' \left( \frac{3.9 \text{ MeV}}{\sqrt{E}} \right) \quad (4)$$

Figure 5A:
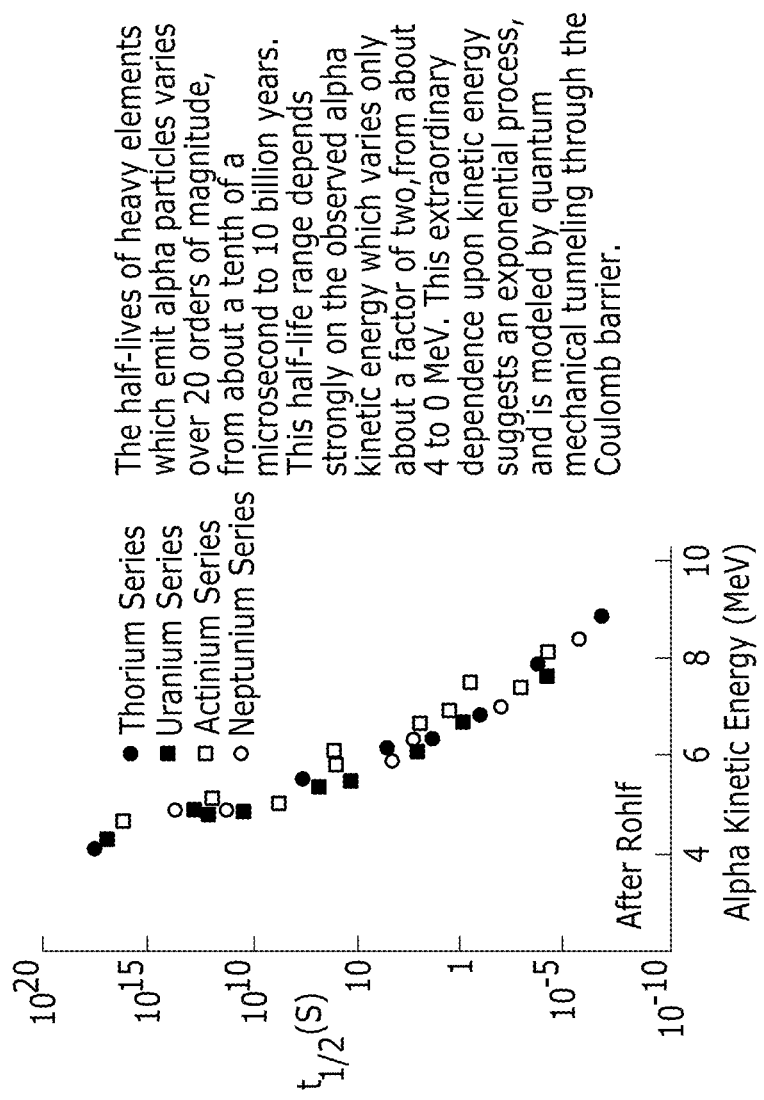
FIG. 5A illustrates a graph of data showing alpha decays for several nuclei as a function of energy.
Figure 5B:
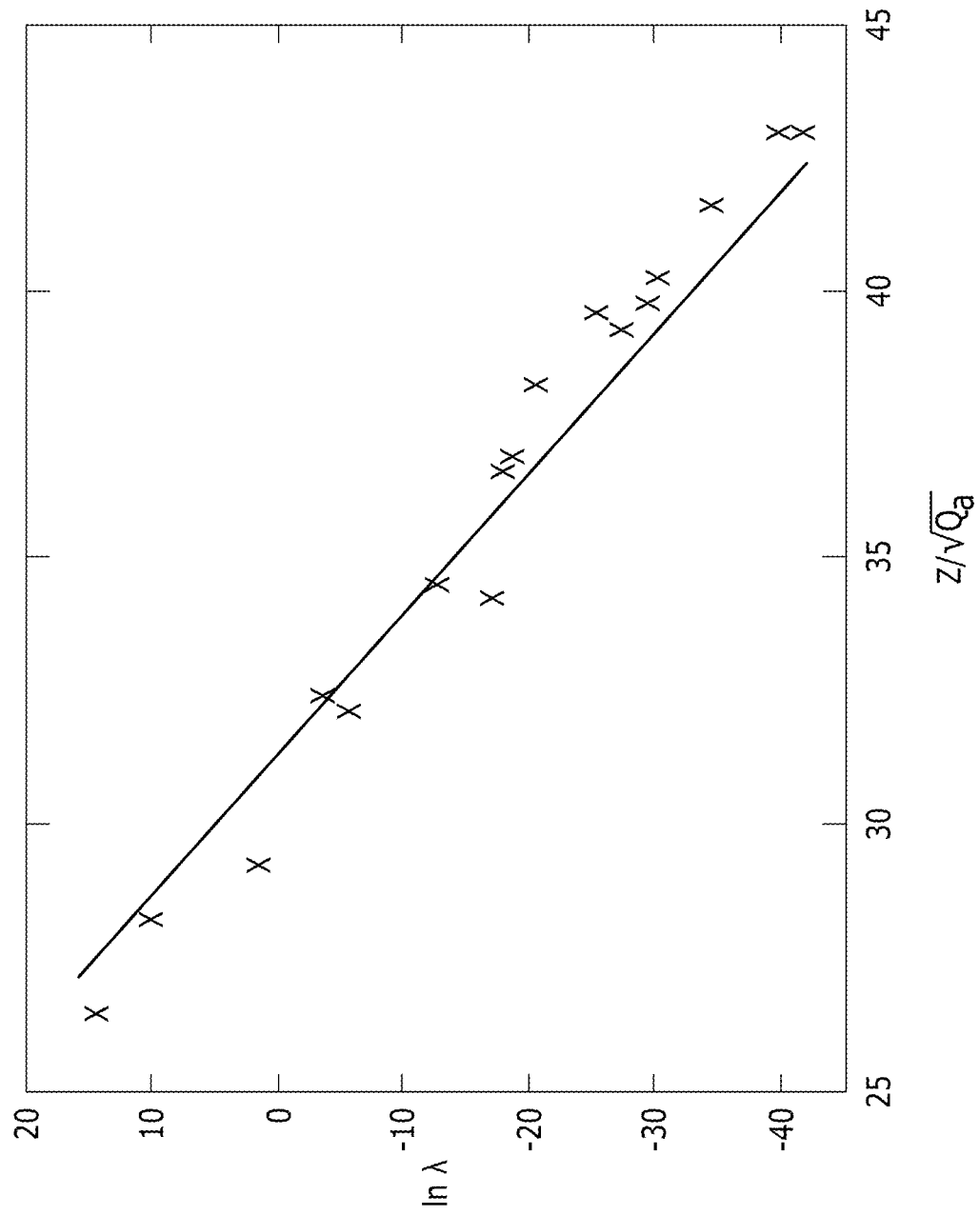
FIG. 5B illustrates a graph of data showing alpha decay as a function of the Gamow (G) factor.

FIG. 5A shows a graph of decay half-life for Thorium, Uranium, Actinium and Neptunium as a function of the energy of the ejected alpha. The plot depicts half-life, plotted on a logarithmic scale (y-axis), versus the energy of the ejected alpha particle on a linear scale (x-axis). Using a linear approximation for the data between 4 MeV and 6 MeV, gives $>>10^{+12}$ change in half-lives. $^{222}$Rn has a half-life of 3.8 days ($3.28 \times 10^{+4}$ sec) and, based on the data in FIG. 6, the energy of the ejected alpha is, as predicted, E~5.59 MeV. If the GSI data were to be accounted for as a change in the energy of the alpha, given that the oscillations are at the scale of 5-15%, the equations above suggest that energy changes of as little as $10^{+2}$-$10^{+3}$ eV (Extreme-UV or Soft X-ray) are required. Note: the equations above are approximated using the Geiger-Nuttall formula and the predictions scale as much as 56 orders of magnitude, FIG. 5B, for a range of:

$$G = 32 - 45 \left[ \frac{Z'}{\sqrt{E}} \right].$$

Figure 5C:
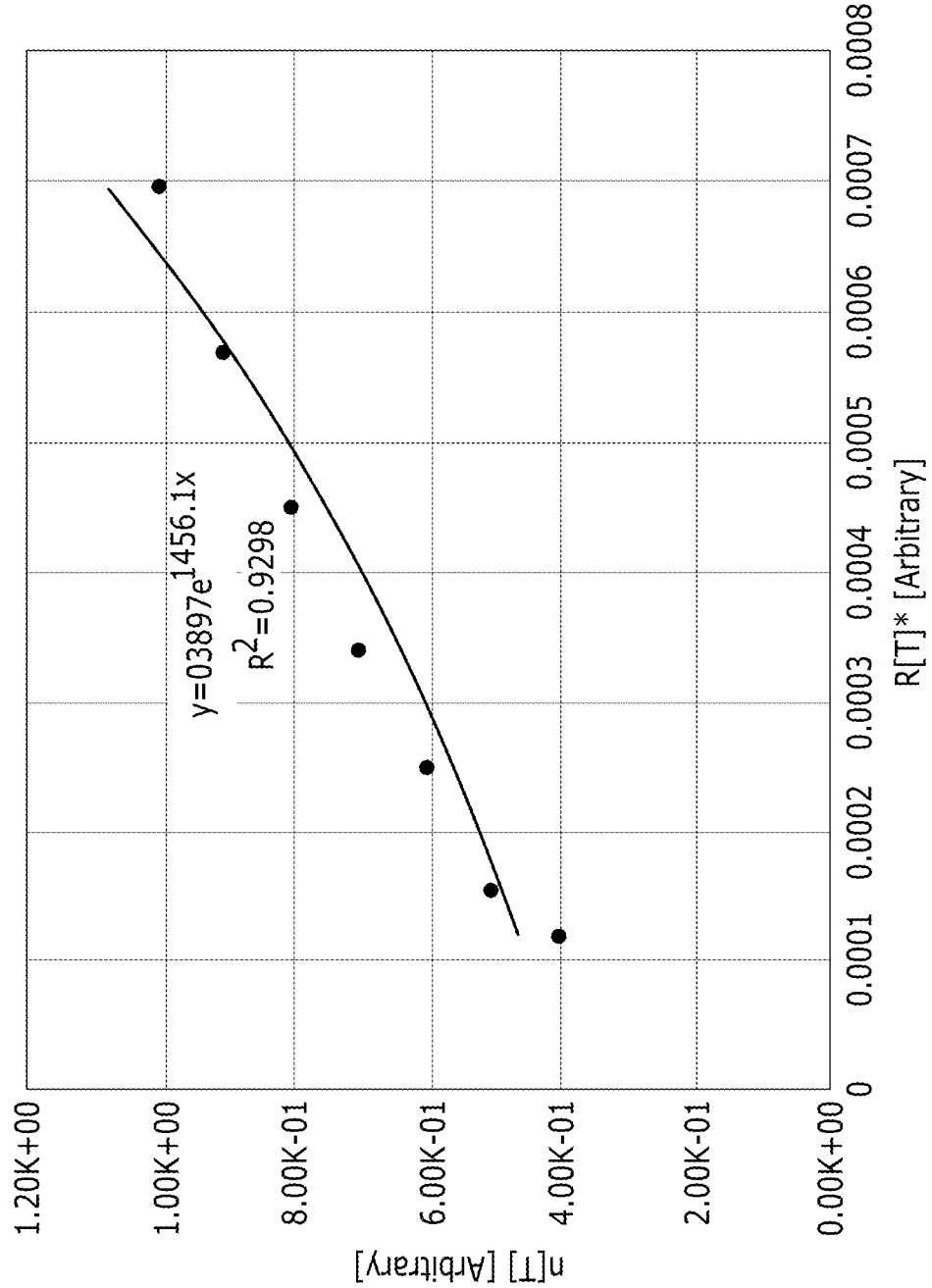
FIG. 5C illustrates nuclear radius plotted against nuclear temperature.

Another approach to connecting axions to nuclear decay involves looking at whether the presence of an axion field could alter the nuclear radius—through axion-nucleon interactions. The nuclear temperature scales exponentially with changes in nuclear radius, see equation 5 and FIG. 5C:

$$n(T) \sim \exp \left[ \frac{R(T) - \alpha}{\beta} \right] \quad (5)$$

The energy of the ejected alpha scales linearly with the nuclear temperature. Nuclear half-life scales exponentially with alpha energy—Gamow factor becomes $$\tau \sim \exp Z' \left[ \frac{3.9}{\sqrt{\eta \cdot \exp\left[\frac{R(T)-\alpha}{\beta}\right]}} \right]$$

where: η is the slope of the line relating alpha energy to the nuclear temperature. Thus the relationship between nuclear radius and nuclear half-life scales as an exponential of an exponential. Note: the original axion model was derived to explain why neutron EDM may always align with its spin. This aligning could become the basis for infinitesimal changes to the nuclear radius.

Axionic Coupling Model

In experimental particle physics, there is a mechanism that connects photons (solar irradiance) to magnetic fields (e.g. earth's B) and neutral particles, e.g. axion, capable of penetrating nuclear matter—due to absence of a Coulomb barrier. This mechanism involves a Primakoff coupling. A photon field can couple in the presence of a magnetic field to a background of axionic dark matter, as depicted in FIGS. 6A and 6B.

Figure 6B:
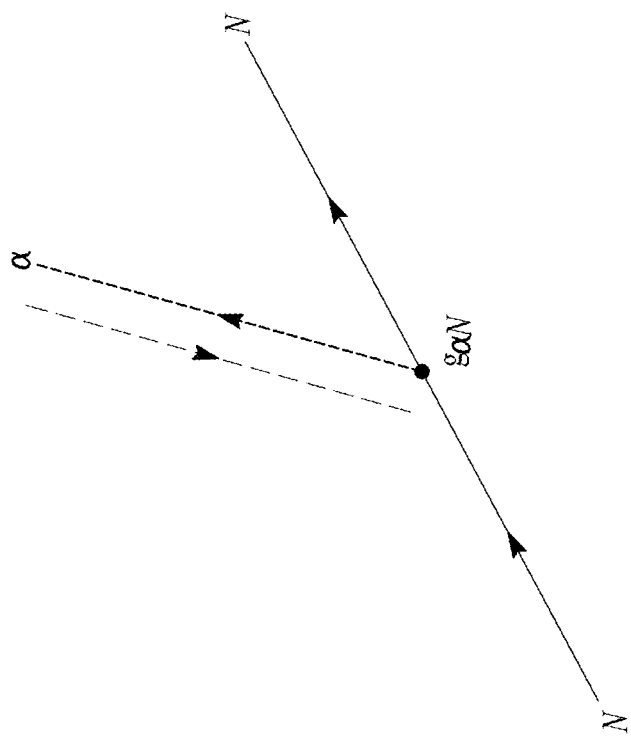
FIG. 6B illustrates the Primakoff coupling of an axion to a nucleon.
Figure 6A:
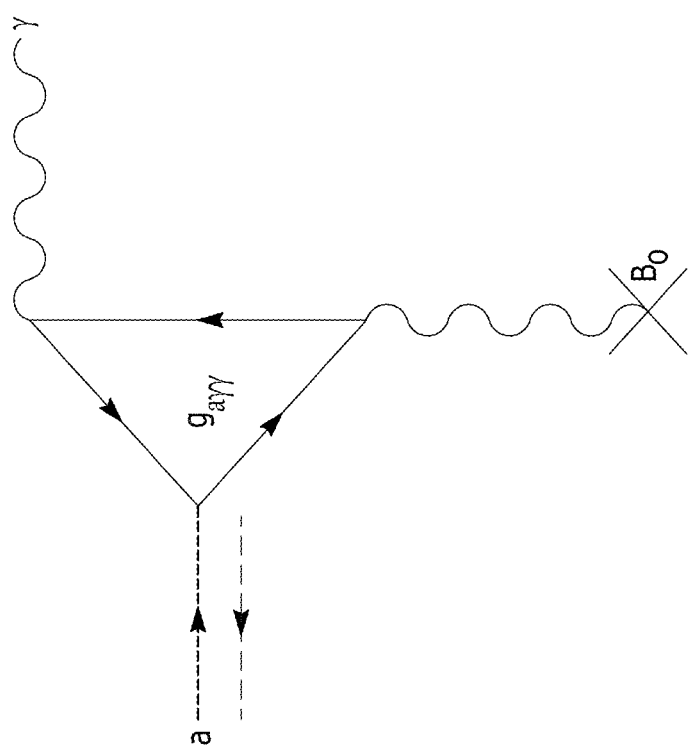
FIG. 6A illustrates the inverse Primakoff effect showing connection of a photon, a magnetic field, and an axionic particle.

The combination of FIGS. 6A and 6B provides a mechanism whereby photons from the Sun could produce or focus axions, which couple to nucleons in atomic nuclei. Such a mechanism allows the sunlight passing through the Earth's magnetic field to influence axionic matter near the surface of the Earth. The axions, in turn, enables solar energy to influence, even catalyze, nuclear processes on Earth. In fact, axionic dark matter was theorized to couple to quarks to eliminate the neutron EDM. This may explain how changes in the intensity of low energy, solar photons coincide with changes in the rates of decay from certain nuclei[1]—in GSI radon data such a coincidence seems to have been observed. Nuclei have characteristic structure functions which make them undergo distinct types of radioactive decays. For this reason, all nuclei need not necessarily show the same effects, as each will have its own structure function. Hence, susceptibility to interactions with any given type of particle may differ from one nucleus to another. Of course in such a model there is a second, major photon field that must be accounted for—albedo radiation.

Figure 7:
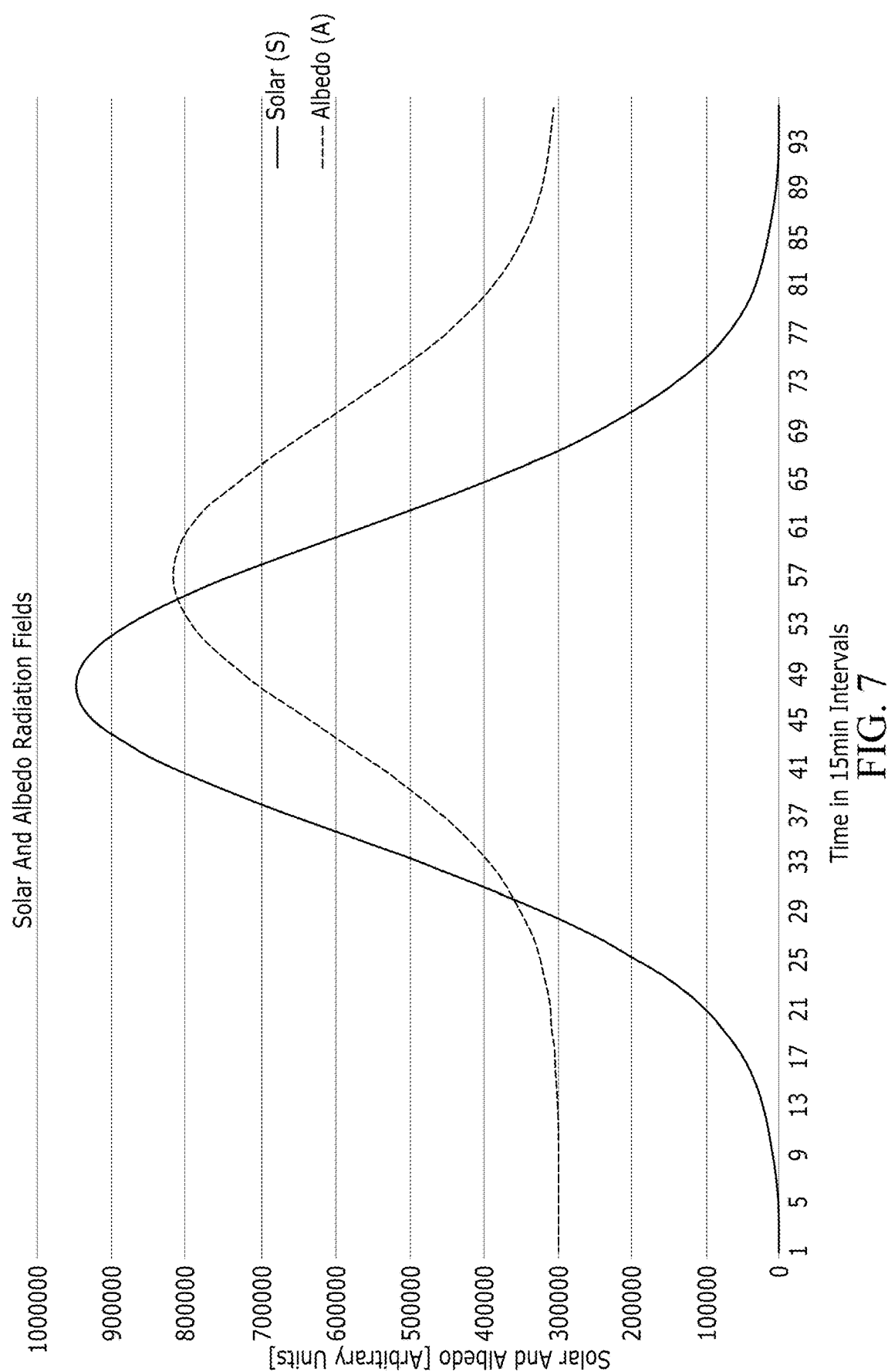
FIG. 7 illustrates solar and albedo radiation fields as measured near the Earth's surface at 15-minute intervals throughout a day.

FIG. 7 shows solar and albedo radiation fields, the two photon fields that bathe the Earth daily. The solar energy peaks at noon for any given region on Earth. The intensity and total hours of daylight depend on the time of year. The Earth reflects radiation, at various positions in the atmosphere and all the way down to the ground, back into outer-space—this is known as albedo radiation. The peak of surface level (ground) albedo radiation occurs at approximately 3 pm—explaining why this is also the hottest part of the day. If a process is impacted by visible energy solar radiation, then, even though the surface level albedo peaks at slightly lower energies, it is reasonable to expect that the same Primakoff process may be impacted by albedo as well. When integrated over the entire day, the albedo radiation will account for much of the solar radiation making it through the Earth's atmosphere. In a Primakoff model, albedo radiation passing through the Earth's magnetic field will also couple to or create axionic dark matter around the Earth.

Figure 8A:
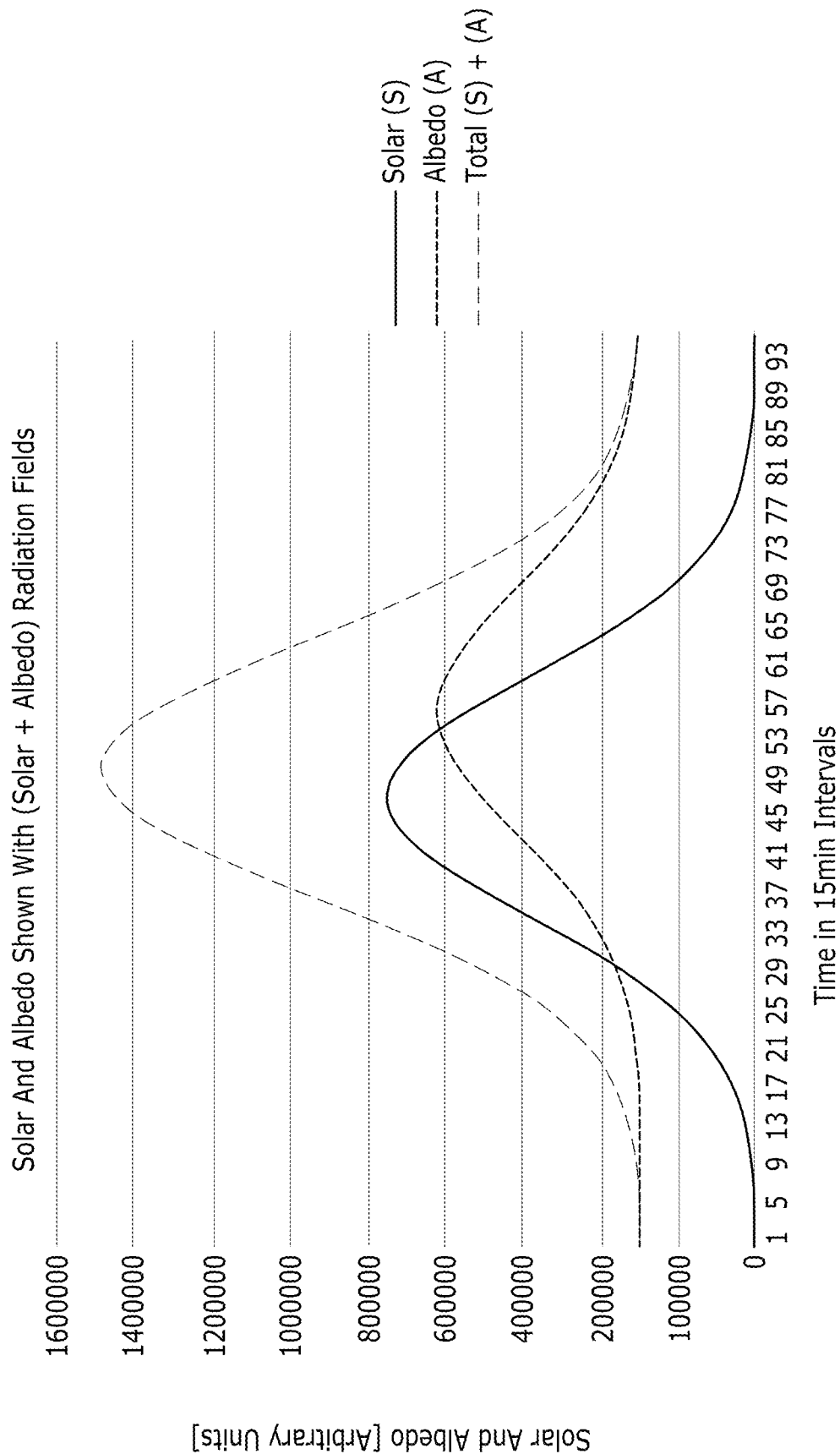
FIG. 8A illustrates the total radiation measured by summing solar and albedo radiation fields as measured near the Earth's surface at 15-minute intervals throughout a day.
Figure 8B:
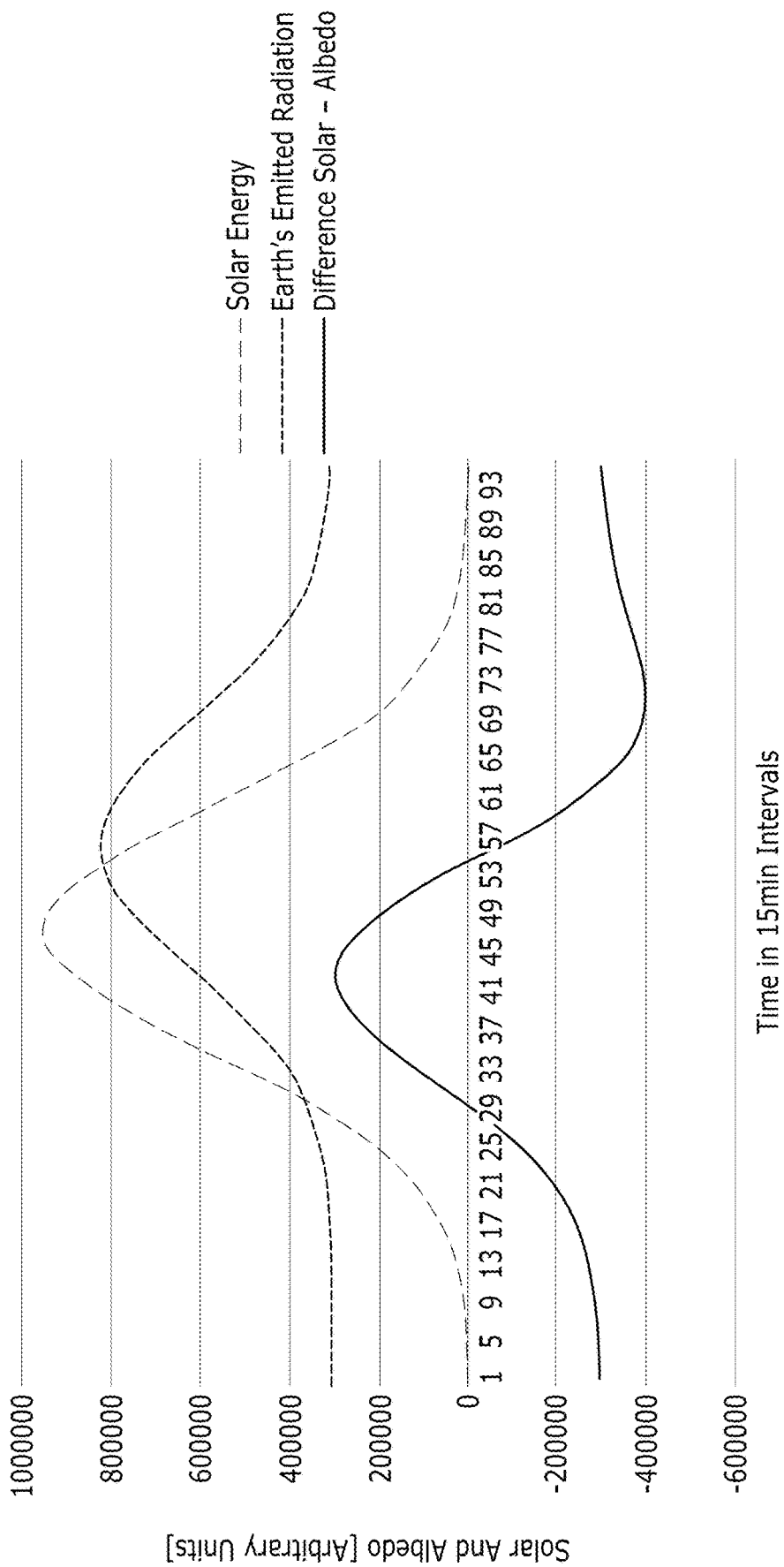
FIG. 8B illustrates the difference between solar and albedo radiation fields as measured near the Earth's surface at 15-minute intervals throughout a day.
Figure 8C:
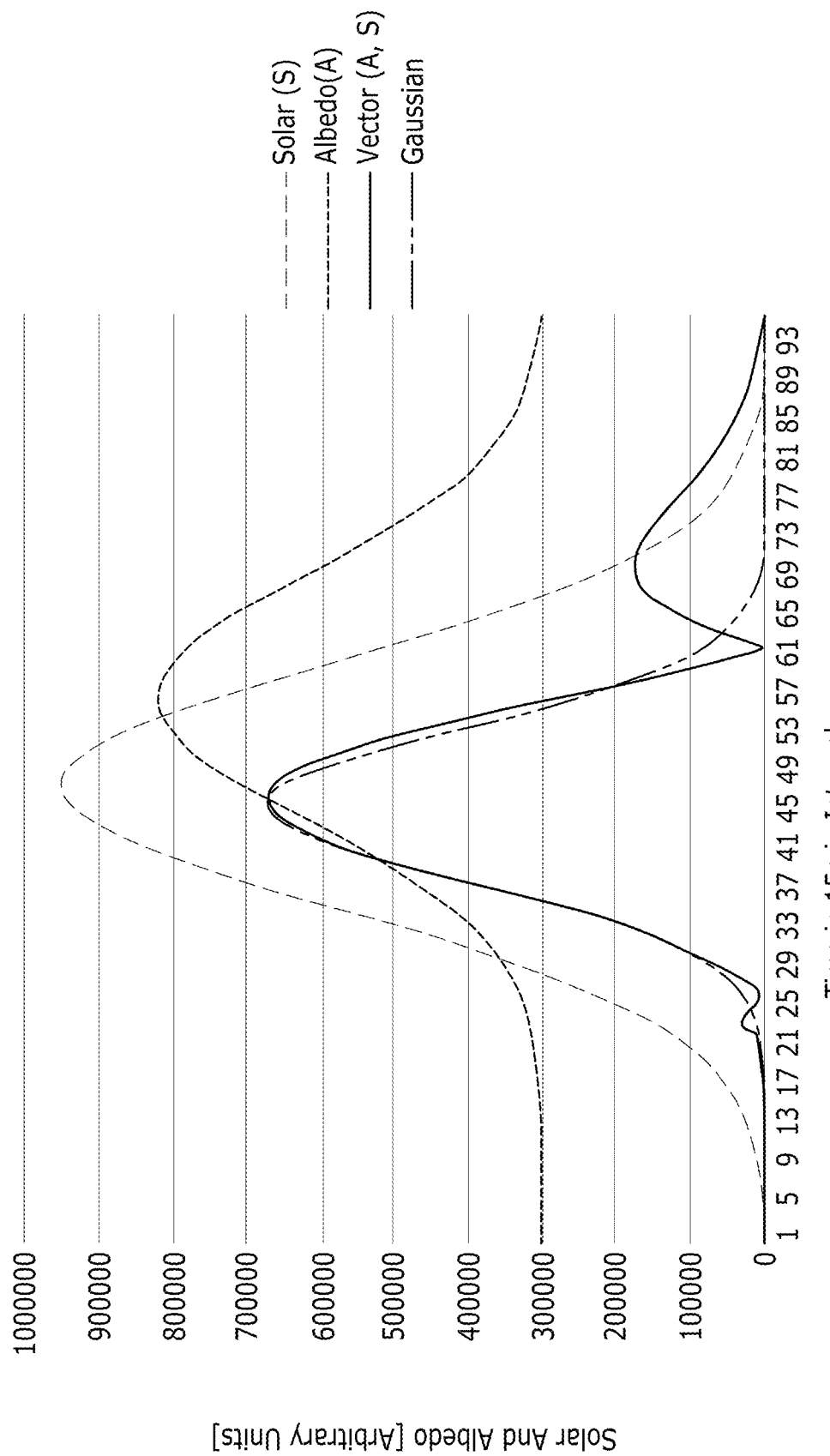
FIG. 8C illustrates a vector sum of solar and albedo radiation fields, taking into account the relative directions of each, as measured at 15-minute intervals throughout a day.

FIGS. 8A-8C illustrate three approaches for combining the solar and surface level albedo radiation fields. First, one can do a simple sum as shown in FIG. 8A, leading to a Gaussian function. Next one can do a simple subtraction as in FIG. 8B, giving an asymmetric function. Finally, the fields can be vector summed as in FIG. 8C, accounting for the relative directions of the fields. In FIG. 8A, the amplitude of the total radiation is added together for each 15 min period during of the day. The sum of two Gaussian function is a Gaussian function, so the gray curve shown is a single, Gaussian peak at approximately 2 pm. In FIG. 8B, the total irradiance due to albedo radiation is subtracted from that of the solar radiation. The graph shows a peak structure that drops below the sideband region (12 am on one day and 1 am on the next day), only to rise to side band level at approximately 9 pm. However, in FIG. 8B, there are only two regions of elevation above the sidebands. One such region occurs three hours after the 6 pm peak observed in the actual GSI data. Additionally, the drop below sideband level occurs at 6 pm and not 3 pm as seen in the GSI data. FIG. 8C shows what happens when the solar radiation is added vectorially to the albedo, taking the direction of energy flow into account. In this panel, there are three characteristic peaks at noon, 6 pm and between 12 am-1 am. Similar to the data, this vector addition in FIG. 8C displays the characteristic Gaussian rise until about noon, followed by a faster than Gaussian drop off between 3 pm and 4 pm. The peak at 6 pm has approximately the same amplitude relative to the noon peak (see, e.g., FIG. 3) with no need to adjust for the longer wavelengths typical of albedo when compared to solar irradiance.

3.0 $^{222}$Rn Decays

Figure 9A:
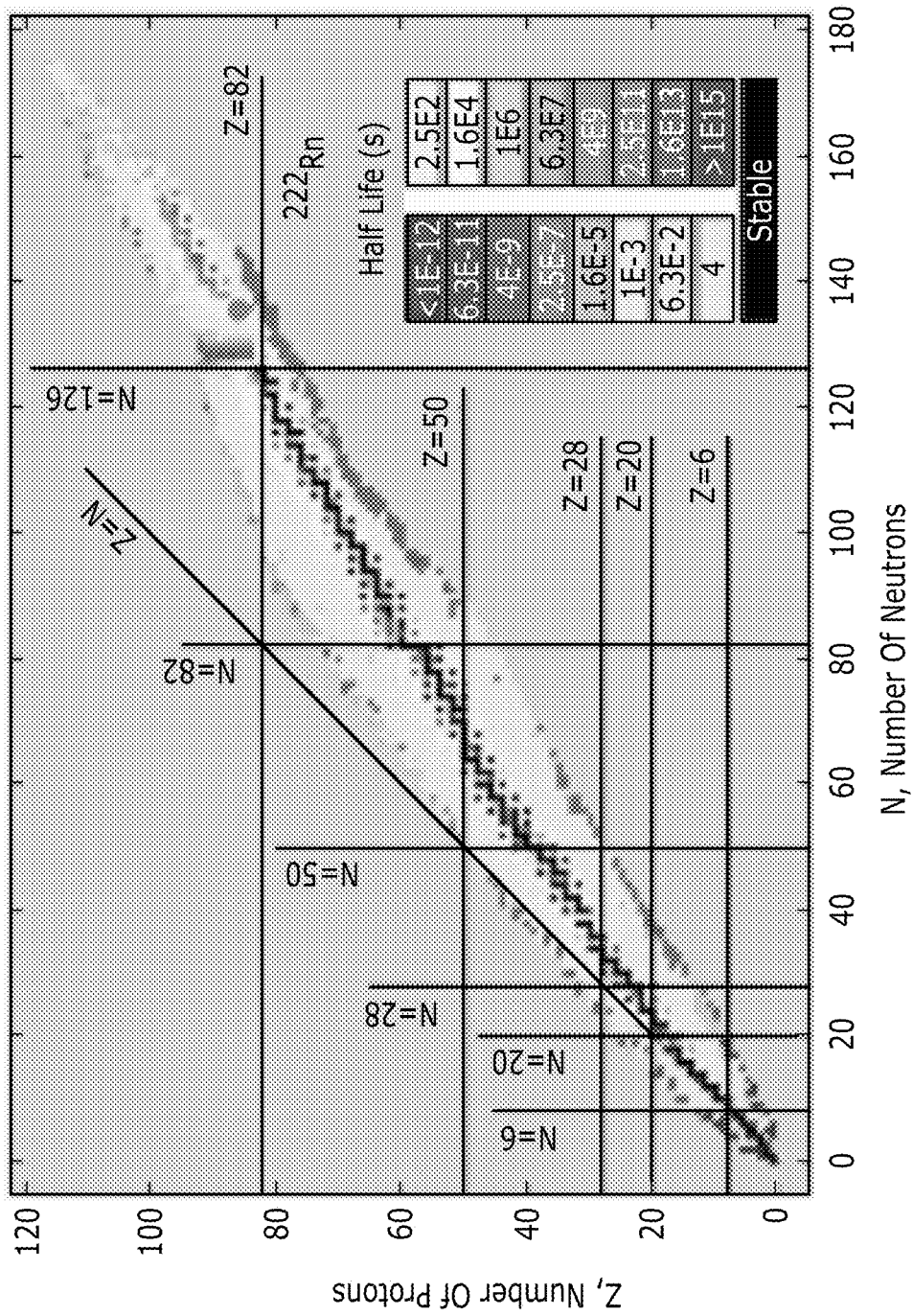
FIG. 9A illustrates the half-lives for all measured nuclear isotopes, with Radon-222 denoted by a circle.
Figure 9B:
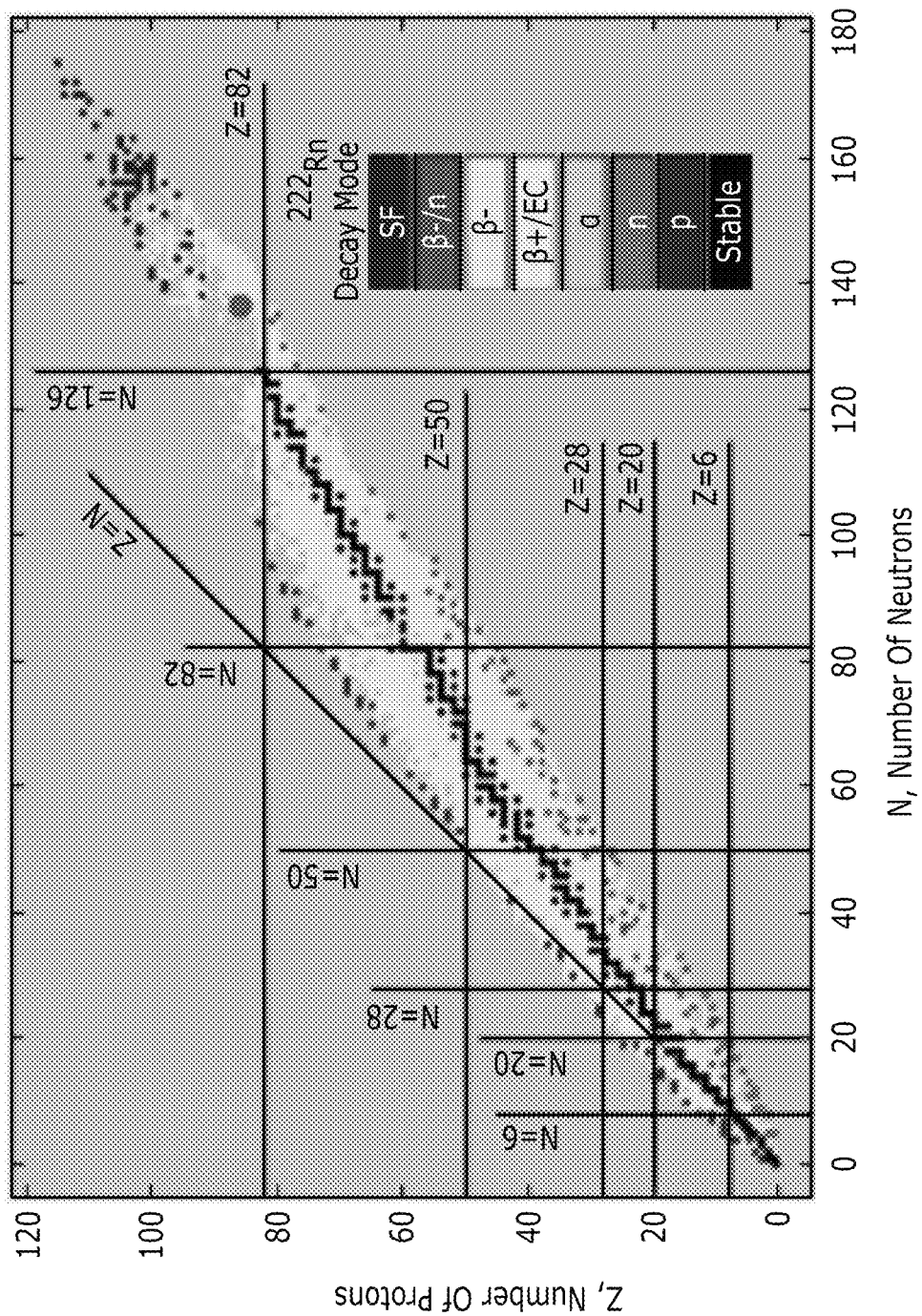
FIG. 9B illustrates the decay modes for all measured nuclear isotopes, with Radon-222 denoted by a circle.

Experimental data show that all elements with fewer than 84 protons have at least one stable, non-decaying, isotope. For elements with proton numbers between 90 and 98, at least one or more isotopes are semi-stable or have lifetimes in excess of 750 years—with many isotopes exceeding tens of thousands, millions or even billions of years. FIGS. 9A and 9B present graphs which summarize our current knowledge of nuclear half-lives and decay modes. Notably, the region for elements with 84-89 protons, known as the "valley of stability," are dominated by both low values for isotope half-lives and a high rate of alpha decays. Near the middle of this "valley of stability" is $^{222}$Rn with 86-protons and 136-neutrons.

$^{222}$Rn has four valence protons that partially fill an h9/2 level and ten valence neutrons, that completely fill the g9/2 level. This is four more protons and ten more neutrons than the "double magic" isotope of lead $^{208}$Pb which has closed neutron and proton shells, and is the last double magic isotope in known nuclei. Due to the filling of the g9/2 level, $^{222}$Rn is the longest lived isotope for all Rn nuclei. However, due to the nuclear force range coupled with the partial filling of the proton level, in the end $^{222}$Rn has a half-life of only 3.82 days. Furthermore, like many of the nuclei in the valley of stability, $^{222}$Rn decays via alpha emission. Elements that have stable nuclei, with less than 84 protons (see the black ridge down the center of FIG. 9), typically have isotopes that will decay via beta emissions when too many or too few nucleons are present. Very rarely and with a significant increase in the number of neutrons needed for stability, some elements will emit an alpha particle. The valley of stability is marked by a region where the typical mode of decay is alpha emission. Thus as an isotope, $^{222}$Rn displays unusual nuclear dynamics compared to most other elements and their isotopes.

In fact, more than half of all known Rn isotopes, 30 out of 40, can decay via alpha emission—for 23 out of 40, alpha decay is the dominant mode, while 17 isotopes decay predominantly by b-decay and 5 decay predominately by b+. Only about 12 elements with fewer than 99 protons (elements with 99+ protons are all man-made) have more than half of their isotopes decay via alpha emission. Some of this decay behavior can be explained by models of the nuclear strong force as a combination of a 3-dimensional harmonic oscillator along with a spin-orbit interaction. It should also be noted that Rn, with such short lived isotopes, only "naturally occurs" due to its production during the 238 and 235U and $^{232}$Th decay chains.

Theory & Experimentation

Theory on GSI

It is tempting to assume that either some standard model physics, or some known type of detector anomaly, can explain the key features of the GSI data. What makes the data so unique, and beyond a standard model or detector glitch explanation, is that the data can be predicted using a vector sum of two low-energy radiation fields. Known phenomena, even accounting for neutrino oscillations and highly biased (highly sensitive) detectors, do not generally respond to directional information for low energy photonic fields.

Consider some potential explanations that do not involve exotic matter couplings including: 1.) Could a known particle, e.g. solar neutrinos, be responsible for the observations, 2.) Is it possible that the detector is hypersensitive to radiation—acting more like night-vision and amplifying low energy radiation fields, 3.) Can levels of radon in the container oscillate within the apparatus, creating a cyclic effect, timed with background radiation heating or 4.) Could electrical oscillations, due to power consumption, create annual and diurnal effects. Each of these potential explanations would fail to describe two very significant, salient features: 1.) the data drop more rapidly than Gaussian, though the solar irradiance follows a more or less Gaussian distribution centered at noon, and 2.) the data show a peak at approximately 6 pm with a duration of approximately 4 hours (daily average).

The problem with solar neutrinos as an explanation: Solar neutrinos tend to oscillate as they move through the Earth, leading to a brighter irradiance of electron neutrinos at midnight versus what is seen through the day. Solar irradiance in the northern hemisphere drops during the winter due to the Earth's tilt. This means that solar neutrinos will then have to travel through a portion of the Earth to reach a detector in the northern hemisphere. The propagation of neutrinos through the ground would lead to oscillations that increase (not decrease) the numbers of electron neutrinos making it into the GSI detector. One should then expect to see an enhancement in radioactive decays depending on electron neutrinos at midnight not noon. Furthermore, there is no reason for solar neutrinos, which can pass through the entire mass of the Earth, to rapidly drop off between 3 pm and 4 pm, only to resurge at 6 pm, by as much as 20-30% of the observed noon rates. If the detector, due to electronic biasing, were to become ultra-sensitive to heat or visible light wavelengths, one would find it difficult to explain how information on the relative direction of solar and albedo radiation fields can be retained. Having albedo radiation around noon directed upwards from the Earth, while solar radiation is directed downwards towards the Earth, would result in an increase of electronic avalanches stimulated by both low energy radiation fields. What is seen in the data, is that the albedo and solar radiations appear to cancel each other around 3 pm as the albedo radiation increases. This is not consistent with a detector where the bias leads to ultra-sensitivity to low energy photons. Similarly, there is no mechanism that would drive radon particles out of the detector as it heats up under the influence of solar energy. However, the additional heat energy due to albedo radiation reduces the effect allowing the radon to recover between 4 pm and 6 pm. Simply stated: heat flowing in one direction cannot be used to remove heat flowing in another direction.

Experimentation

If the GSI observations are due to a Primakoff mechanism, this is something that can be tested experimentally. There have been a significant number of experiments, proposed and executed, attempting to see the Primakoff coupling. Previous approaches focused on propagating photons, usually utilizing a laser, through an external, table-top magnetic field and searching for selected absorption or evidence of scattering. The Primakoff coupling scales with both the strength of the field (B) and the length of the region (L) through which the photons travel. While table-top magnets can achieve fields up to 52 T ($5.2 \cdot 10^{+5}$ gauss), the distance scales are usually of order 0.05-10 m. For the Earth-Sun system, the earth has surface magnetic field of ~0.5 gauss that stretches for thousands of kilometers ($10^{+6}$ m). In a follow up paper, a comparison between the Earth-Sun (B-L) parameters and what can be achieved with a terrestrial, table-top experiment will be presented.

What is also notable, based on the GSI data, is an absence of experiments using a geometry where any collective, focusing effects would be expected. Thus far, experimental approaches were staged to see the impacts of axions on photon beams (cavity experiments) or to cause axions to absorb and re-radiate photonic energy ("light through a wall"). The sheer number of axionic particles encountered in cavity approaches, for example, is limited by the cross sectional area of a laser beam coupled with the length scale for the magnetic field. No attempts to date have been made that would take advantage of a wide area of axionic particles expected near the surface of the earth. Nor have experiments been performed to take advantage of potential sensitivity of nuclei to minute changes in alpha energy, that a neutral, weakly-interacting particle can uniquely cause.

SUMMARY

The Geological Survey of Israel (GSI) experiment was design to detect subtle changes in the radon decay for purposes of investigating behavior of radon in an enclosed environment. To this end, the detection scheme was designed to be particularly sensitive to decay products of radon. The system was sealed for the entire 10 years of data taking and there are no internal, movable parts. The datalogger and detectors were all powered via battery—isolating them from the local power grid, preventing influence from human power consumption. The data over six years exhibits a consistent diurnal and annual variation. The annual oscillations, which follow solar irradiance, show that low energy radiation correlates with the amplitude and time of the primary peak. Furthermore, the sudden drop at 3 pm, followed by a second peak at 6 pm can be created by vector addition of solar and albedo radiation, which is a process that has not been predicted for radioactive nuclear decay.

The observations appear to be consistent with a mechanism such as the Primakoff, whereby photons couple to both magnetic fields and ambient, axionic matter. In such a model, two radiation fields influence a background of axionic dark matter in such a way as to focus or change the trajectory of these particles. Additionally, this allows two radiation fields in the presence of a magnetic field, in a Primakoff model, to compete with each other and produce a rapid drop off as observed between noon and 3 pm. Thus, vector behavior of photonic radiation can be observed in nuclear radiation. What remains to be done: staging an experiment that takes advantage of both nuclear sensitivity through alpha decay as well as the possibility of focusing of streams of dark matter axionic particles onto a target.

Example System for Coupling Fields to Exotic Matter

Figure 10:
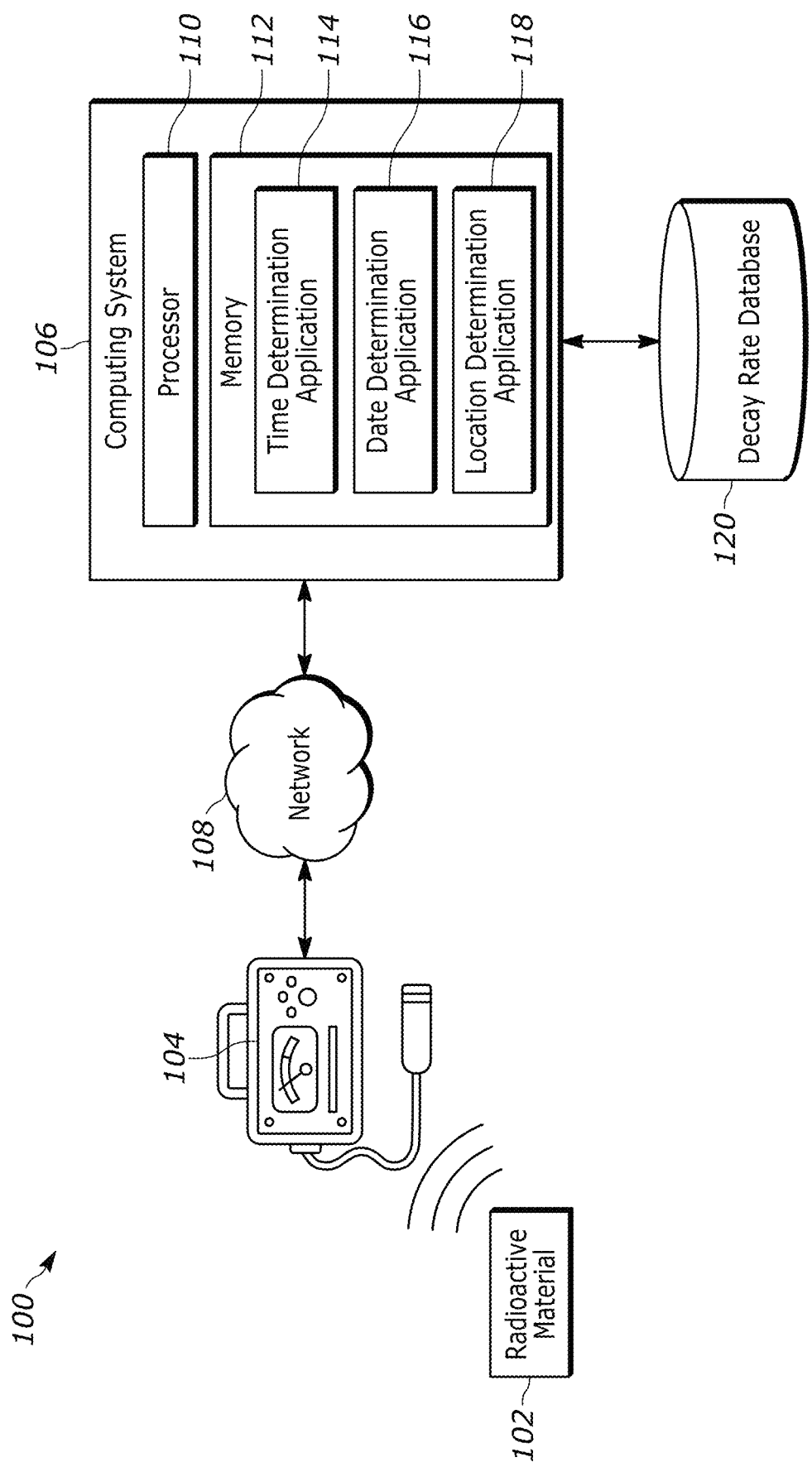
FIG. 10 depicts an exemplary computer system for coupling fields to exotic matter at a particular location, in order to identify the particular location or determine the current date or time at that particular location, according to one embodiment.

Referring now to the drawings, FIG. 10 depicts an exemplary computer system 100 for coupling fields to exotic matter at a particular location in order to identify the particular location or determine the current date or time at that particular location, according to one embodiment. The high-level architecture illustrated in FIG. 10 may include both hardware and software applications, as well as various data communications channels for communicating data between the various hardware and software components, as is described below.

The system 100 may include radioactive material 102, one or more sensors 104 (which may include, e.g., a Geiger counter) configured to determine a decay rate associated with a radioactive material 102, a computing system 106, which is described in greater detail below with respect to FIG. 12. In some examples, the one or more sensors 104 may be housed within the computing system 106, or may otherwise be configured to communicate with the system 106 via a wired or wireless computer network 108.

Although one sensor 104, one computing system 106, and one network 108 are shown in FIG. 10, any number of such sensors 104, computing systems 106, and networks 108 may be included in various embodiments. To facilitate such communications the sensors 104 and the computing system 106 may each respectively comprise a wireless transceiver to receive and transmit wireless communications.

In some embodiments the computing system 106 may comprise one or more servers, which may comprise multiple, redundant, or replicated servers as part of a server farm. In still further aspects, such server(s) may be implemented as cloud-based servers, such as a cloud-based computing platform. For example, such server(s) may be any one or more cloud-based platform(s) such as MICROSOFT AZURE, AMAZON AWS, or the like. Such server(s) may include one or more processor(s) 110 (e.g., CPUs) as well as one or more computer memories 112.

Memories 112 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 122 may store an operating system (OS) (e.g., Microsoft Windows, Linux, UNIX, etc.) capable of facilitating the functionalities, apps, methods, or other software as discussed herein. Memorie(s) 112 may also store a time determination application 114, a date determination application 116, and/or a location determination application 118.

Additionally, or alternatively, the memorie(s) 112 may store historical decay rate data from various sources. This historical decay rate data may include historical decay rates at various times in various locations for a particular type of radioactive material 102. The decay rate data may also be stored in a decay rate database 120, which may be accessible or otherwise communicatively coupled to the computing system 106.

Executing the time determination application 114 may include analyzing decay rates associated with the radioactive material 102 in a particular location, as captured by the sensor(s) 104, in order to determine time at which a particular decay rate occurred. For instance, the time determination application 114 may compare a decay rate associated with the radioactive material 102 as captured by the sensor 104 at a particular point in time to known decay rates associated with the particular radioactive material 102 over the course of a day in the particular location (e.g., as captured by the sensor 104 from a previous day and stored in the memory 112, or as retrieved from the database 120). Based on the comparison, the time determination application 114 may determine a time of day that matches the decay rate associated with the radioactive material 102 in the particular location, as captured by the sensor(s) 104 at a particular point in time. In some examples, the time determination application 114 may further provide an indication of the identified date to a user of the computing system 106, e.g. via a user interface display that may be part of the computing system 106 or in communication with the computing system 106. For instance, users may use the time determination application 114 to determine the current time in their own location if they are co-located with the radioactive material 102.

Similarly, executing the date determination application 116 may include analyzing fluctuations in the decay rate associated with the radioactive material 102 in a particular location, as captured by the sensors 104, over the course of a day, in order to determine a date at which a particular fluctuations in decay rate occurred. For instance, the date determination application 116 may compare the fluctuation in decay rates associated with the radioactive material 102 as captured by the sensor 104 over the course of a particular day to historical fluctuations in decay rates associated with the particular radioactive material 102 over the course of a year in the particular location (e.g., as captured by the sensor 104 over the past year and stored in the memory 112, or as retrieved from the database 120). Based on the comparison, the date determination application 116 may determine a date in the year that matches the fluctuations associated with the radioactive material 102 in the particular location, as captured by the sensor(s) 104 over the course of a particular day. In some examples, the date determination application 116 may further provide an indication of the identified date to a user of the computing system 106, e.g. via a user interface display that may be part of the computing system 106 or in communication with the computing system 106. For instance, users may use the date determination application 116 to determine the date in their own location if they are co-located with the radioactive material 102.

Furthermore, executing the location determination application 118 may include analyzing fluctuations in the decay rate associated with the radioactive material 102 in a particular location, as captured by the sensors 104, over the course of a period of time, in order to identify the particular location where the radioactive material 102 is located. For instance, the location determination application 118 may compare the fluctuation in decay rates associated with the radioactive material 102 in the particular location as captured by the sensor 104 over a period of time to historical fluctuations in decay rates associated with the particular radioactive material 102 over time in various locations (e.g., as retrieved from a database 120 storing historical fluctuations in decay rates, decay rate peaks, etc., from various locations worldwide). Based on the comparison, the location determination application 118 may identify a particular location that matches the fluctuations associated with the radioactive material 102 as captured by the sensor(s) 104 over the period of time. In some examples, the location determination application 118 may further provide an indication of the identified location to a user of the computing system 106, e.g. via a user interface display that may be part of the computing system 106 or in communication with the computing system 106. For instance, users may use the location determination application 118 to determine their own location if they are co-located with the radioactive material 102. Moreover, users may user the location determination application 118 to determine the location of the radioactive material 102, if its location is unknown.

In addition, memories 112 may also store additional machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For instance, in some examples, the computer-readable instructions stored on the memory 112 may include instructions for carrying out any of the steps of the method 200 via an algorithm executing on the processors 110, which is described in greater detail below with respect to FIG. 11. It should be appreciated that one or more other applications may be envisioned and that are executed by the processor(s) 110. It should be appreciated that given the state of advancements of mobile computing devices, all of the processes functions and steps described herein may be present together on a mobile computing device.

Example Method for Coupling Fields to Exotic Matter

Figure 11:
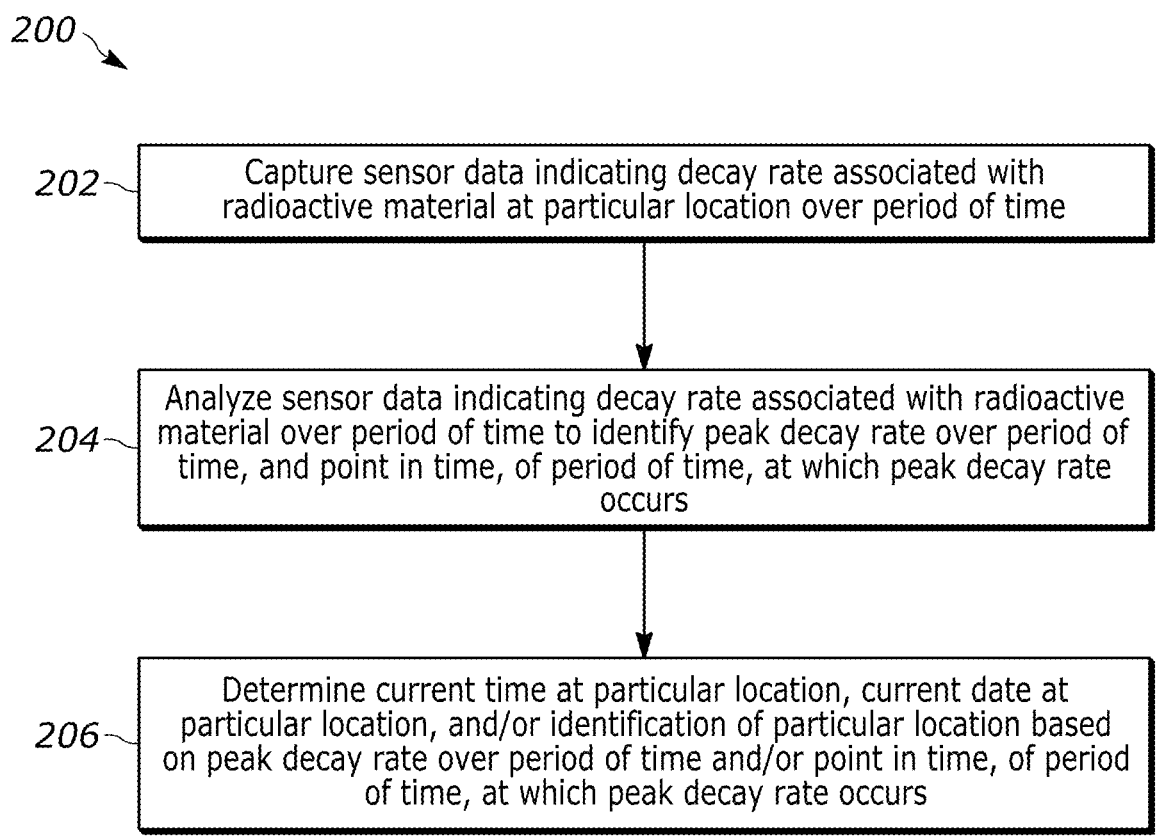
FIG. 11 depicts a flow diagram of an exemplary computer-implemented method for coupling fields to exotic matter at a particular location, in order to identify the particular location or determine the current date or time at that particular location, according to one embodiment.

FIG. 11 depicts a flow diagram of an exemplary computer-implemented method 200 for coupling fields to exotic matter at a particular location in order to identify the particular location or determine the current date or time at that particular location, according to one embodiment. One or more steps of the method 200 may be implemented as a set of instructions stored on a computer-readable memory (e.g., memory 112) and executable on one or more processors (e.g., processor 110).

The method 200 may include capturing (block 202), by one or more sensors (e.g., sensors 104), or otherwise obtaining (e.g., retrieving from a database), sensor data indicating a decay rate associated with a radioactive material (e.g., radioactive material 102), such as Radon-222, at a particular location over a period of time (e.g., 24 hours). For instance, the one or more sensors may include a Geiger counter. In some examples, the method 200 may further include capturing additional sensor data indicating a decay rate associated with the radioactive material at the particular location over an additional period of time (e.g., a one year period of time). In some examples, the method 200 may also include capturing or otherwise obtaining (e.g., retrieving from a database) sensor data indicating a decay rate associated with the radioactive material at various locations over various periods of time.

The method 200 may further include analyzing (block 204) the sensor data indicating the decay rate associated with the radioactive material at the particular location over the period of time (and/or any additional periods of time) in order to identify a peak decay rate over the period of time and a point in time, over the period of time (and/or any additional periods of time), at which the peak decay rate occurred for that period of time (and/or for any additional periods of time). In some examples, the method 200 may further include determining an amount of elapsed time since the point in time at which the peak decay rate occurred. Moreover, in some examples, the method 200 may further include obtaining/determining sensor data indicating a current decay rate associated with the radioactive material at the particular location.

Additionally, the method 200 may include determining (block 206) one or more of: a current time at the particular location, a current date at the particular location, or an identification of the particular location, based on one or more of: the peak decay rate or the point in time over the period of time at which the peak decay rate occurred. In some examples, determining the current time at the particular location may be further based on the amount of elapsed time since the point in time at which the peak decay rate occurred. Additionally, in some examples, determining the current time at the particular location may be further based on the current decay rate associated with the radioactive material at the particular location.

Furthermore, in some examples, determining the current date at the particular location may be further based on comparing the peak decay rate associated with the radioactive material at the particular location over a first period of time (e.g., a 24 hour period of time over the current date) to the peak decay rate associated with the radioactive material over a second period of time (e.g., a one-year period of time).

Moreover, in some examples, determining the identification of the particular location may include comparing the peak decay rate associated with the radioactive material at the particular location over the period of time to the peak decay rates associated with the radioactive material at various locations over the same period of time and determining the identification of the particular location based on the comparison.

Example Computing System

Figure 12:
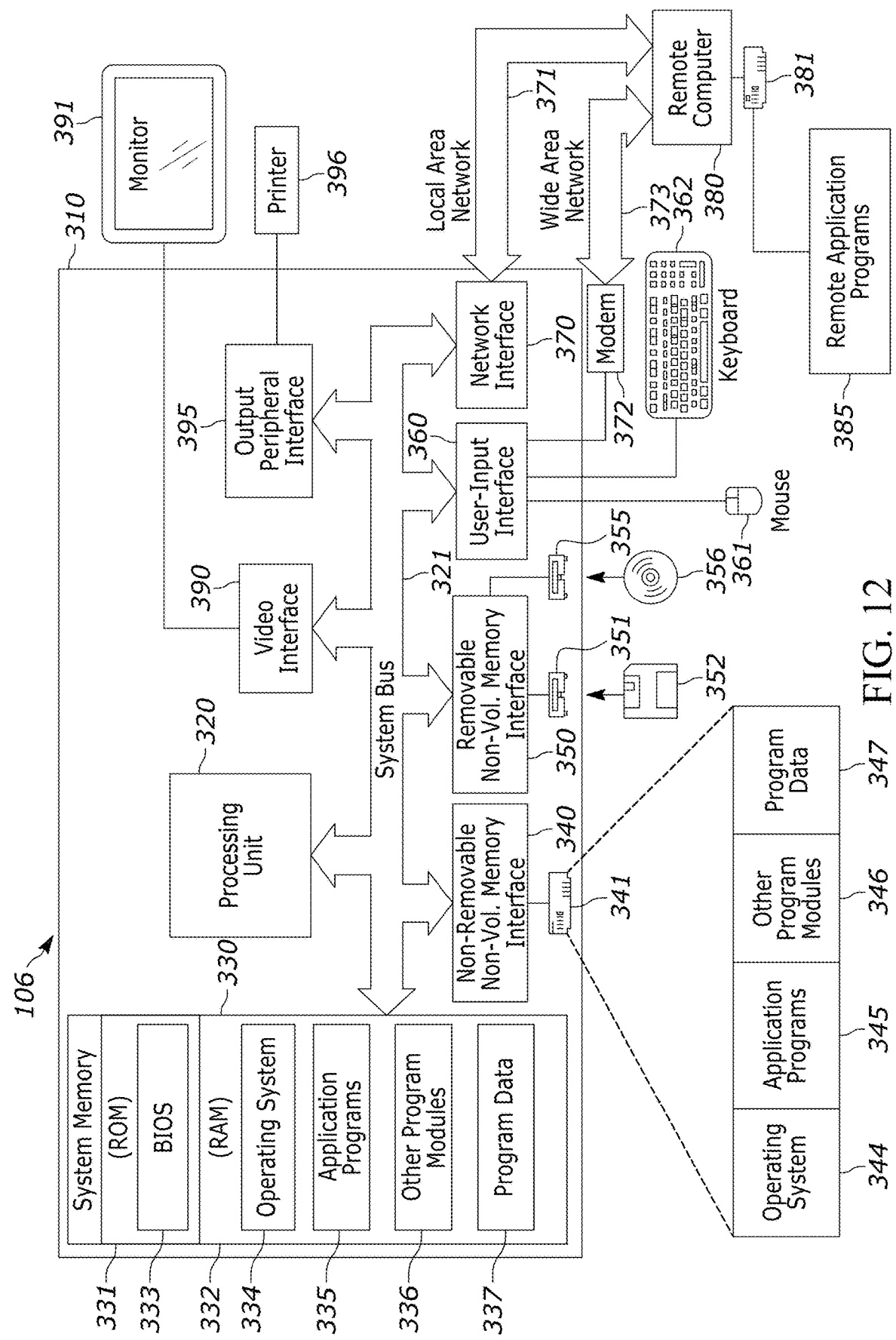
FIG. 12 depicts an exemplary computing system in which the techniques described herein may be implemented, according to one embodiment.

FIG. 12 depicts an exemplary computing system 106 for coupling fields to exotic matter at a particular location in order to identify the particular location or determine the current date or time at that particular location in which the techniques described herein may be implemented, according to one embodiment. The computing system 106 of FIG. 12 may include a computing device in the form of a computer 310. Components of the computer 310 may include, but are not limited to, a processing unit 320 (e.g., corresponding to the processor 110 of FIG. 10), a system memory 330 (e.g., corresponding to the memory 112 of FIG. 10), and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media.

Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 12 illustrates operating system 334, application programs 335 (e.g., corresponding to the time determination application 114 and/or the date determination application 116 of FIG. 10), other program modules 336, and program data 337.

The computer 310 may also include other removable/non-removable, volatile/nonvolatile computer storage media. By way of example only, FIG. 12 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 12 provide storage of computer-readable instructions, data structures, program modules and other data for the computer 310. In FIG. 12, for example, hard disk drive 341 is illustrated as storing operating system 344, application programs 345, other program modules 346, and program data 347. Note that these components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a mobile computing device, personal computer, a server, a router, a network PC, a peer device or other common network node, and may include many or all of the elements described above relative to the computer 310, although only a memory storage device 381 has been illustrated in FIG. 12. The logical connections depicted in FIG. 12 include a local area network (LAN) 371 and a wide area network (WAN) 373 (e.g., either or both of which may correspond to the network 108 of FIG. 10), but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 12 illustrates remote application programs 385 as residing on memory device 381.

The techniques for coupling fields to exotic matter at a particular location in order to identify the particular location or determine the current date or time at that particular location described above may be implemented in part or in their entirety within a computing system such as the computing system 106 illustrated in FIG. 12. In some such embodiments, the LAN 371 or the WAN 373 may be omitted. Application programs 335 and 345 may include a software application (e.g., a web-browser application) that is included in a user interface, for example.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for coupling fields to exotic matter at a particular location in order to identify the particular location or determine the current date or time at that particular location. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for coupling fields to exotic matter at a particular location in order to identify the particular location or determine the current date or time at that particular location, comprising:
   capturing, by one or more sensors, sensor data indicating a decay rate associated with a radioactive material at a particular location over a period of time;
   analyzing, by one or more processors, the sensor data indicating the decay rate associated with the radioactive material at the particular location over the period of time in order to identify a peak decay rate over the period of time and a point in time, over the period of time, at which the peak decay rate occurred; and
   determining, by the one or more processors, one or more of: a current time at the particular location, a current date at the particular location, or an identification of the particular location, based on one or more of: the peak decay rate or the point in time over the period of time at which the peak decay rate occurred.

2. The computer-implemented method of claim 1, wherein the one or more sensors include a Geiger counter.

3. The computer-implemented method of claim 1, wherein the period of time is 24 hours.

4. The computer-implemented method of claim 1, wherein the radioactive material is Radon-222.

5. The computer-implemented method of claim 1, further comprising:
   determining, by the one or more processors, an amount of elapsed time since the point in time at which the peak decay rate occurred; and
   wherein determining the current time at the particular location is further based on the amount of elapsed time since the point in time at which the peak decay rate occurred.

6. The computer-implemented method of claim 1, further comprising:
   determining, by the one or more sensors, sensor data indicating a current decay rate associated with the radioactive material at the particular location; and
   wherein determining the current time at the particular location is further based on the current decay rate associated with the radioactive material at the particular location.

7. The computer-implemented method of claim 1, wherein the period of time is a first period of time and occurs over the current date at the particular location, and wherein determining the current date at the particular location further comprises:
   capturing, by one or more sensors, sensor data indicating a decay rate associated with the radioactive material at the particular location over a second period of time, the second period of time being at least one year in duration;
   determining, by the one or more processors, a peak decay rate associated with the radioactive material at the particular location over the second period of time;
   comparing, by the one or more processors, the peak decay rate associated with the radioactive material at the particular location over the first period of time to the peak decay rate associated with the radioactive material at the particular location over the second period of time; and
   determining, by the one or more processors, the current date at the particular location based on the comparison.

8. The computer-implemented method of claim 1, wherein the period of time occurs over the current date at the particular location, and wherein determining the current date at the particular location further comprises:
   retrieving, by the one or more processors, an indication of a peak decay rate associated with the radioactive material at the particular location over a year; and
   comparing, by the one or more processors, the peak decay rate associated with the radioactive material at the particular location over the year to the peak decay rate associated with the radioactive material over the period of time; and
   determining, by the one or more processors, the current date at the particular location based on the comparison.

9. The computer-implemented method of claim 1, wherein determining the identification of the particular location further comprises:
   retrieving, by the one or more processors, an indication of peak decay rates associated with the radioactive material at various locations over the same period of time;
   comparing, by the one or more processors, the peak decay rate associated with the radioactive material at the particular location over the period of time to the peak decay rates associated with the radioactive material at various locations over the same period of time; and
   determining the identification of the particular location based on the comparison.

10. A system for coupling fields to exotic matter at a particular location in order to identify the particular location or determine the current date or time at that particular location, comprising:
    one or more sensors configured to capture sensor data indicating a decay rate associated with a radioactive material at a particular location over a period of time;
    one or more processors; and
    a non-transitory memory storing computer readable instructions that, when executed by the one or more processors, cause the one or more processors to:
        analyze the sensor data indicating the decay rate associated with the radioactive material at the particular location over the period of time in order to identify a peak decay rate over the period of time and a point in time, over the period of time, at which the peak decay rate occurred; and
        determine one or more of: a current time at the particular location, a current date at the particular location, or an identification of the particular location, based on one or more of: the peak decay rate or the point in time over the period of time at which the peak decay rate occurred.

11. The system of claim 10, wherein the one or more sensors include a Geiger counter.

12. The system of claim 10, wherein the period of time is 24 hours.

13. The system of claim 10, wherein the radioactive material is Radon-222.

14. The system of claim 10, wherein the computer readable instructions, when executed by the one or more processors, further cause the one or more processors to:
    determine an amount of elapsed time since the point in time at which the peak decay rate occurred; and
    wherein determining the current time at the particular location is further based on the amount of elapsed time since the point in time at which the peak decay rate occurred.

15. The system of claim 10, wherein the computer readable instructions, when executed by the one or more processors, further cause the one or more processors to:
  determining, by the one or more sensors, sensor data indicating a current decay rate associated with the radioactive material at the particular location; and
  wherein determining the current time at the particular location is further based on the current decay rate associated with the radioactive material at the particular location.

16. The system of claim 10, wherein the period of time is a first period of time and occurs over the current date at the particular location, and wherein determining the current date at the particular location further comprises:
  capturing sensor data indicating a decay rate associated with the radioactive material at the particular location over a second period of time, the second period of time being at least one year in duration;
  determining a peak decay rate associated with the radioactive material at the particular location over the second period of time;
  comparing the peak decay rate associated with the radioactive material at the particular location over the first period of time to the peak decay rate associated with the radioactive material at the particular location over the second period of time; and
  determining the current date at the particular location based on the comparison.

17. The system of claim 10, wherein the period of time occurs over the current date at the particular location, and wherein determining the current date at the particular location further comprises:
  retrieving an indication of a peak decay rate associated with the radioactive material at the particular location over a year; and
  comparing the peak decay rate associated with the radioactive material at the particular location over the year to the peak decay rate associated with the radioactive material over the period of time; and
  determining the current date at the particular location based on the comparison.

18. The system of claim 10, wherein determining the identification of the particular location further comprises:
  retrieving an indication of peak decay rates associated with the radioactive material at various locations over the same period of time;
  comparing the peak decay rate associated with the radioactive material at the particular location over the period of time to the peak decay rates associated with the radioactive material at various locations over the same period of time; and
  determining the identification of the particular location based on the comparison.

19. A non-transitory computer-readable medium storing instructions for coupling fields to exotic matter at a particular location in order to identify the particular location or determine the current date or time at that particular location, that, when executed by one or more processors, cause the one or more processors to:
  receive sensor data from one or more sensors indicating a decay rate associated with a radioactive material at a particular location over a period of time;
  analyze the sensor data indicating the decay rate associated with the radioactive material at the particular location over the period of time in order to identify a peak decay rate over the period of time and a point in time, over the period of time, at which the peak decay rate occurred; and
  determine one or more of: a current time at the particular location, a current date at the particular location, or an identification of the particular location, based on one or more of: the peak decay rate or the point in time over the period of time at which the peak decay rate occurred.

20. The non-transitory computer-readable medium of claim 19, wherein the one or more sensors include a Geiger counter.

* * * * *